US007922575B2

(12) United States Patent
Jankowski

(10) Patent No.: US 7,922,575 B2

(45) Date of Patent: Apr. 12, 2011

(54) SLOT MACHINE GAME HAVING INDIVIDUAL LINE-WIN MULTIPLIERS

(75) Inventor: Edward Joseph Jankowski, Kenosha, WI (US)

(73) Assignee: GC2, Inc., Arlington Heights, IL (US)

( * ) Notice: Subject to any disclaimer, the term of this patent is extended or adjusted under 35 U.S.C. 154(b) by 703 days.

(21) Appl. No.: 11/923,262

(22) Filed: Oct. 24, 2007

(65) Prior Publication Data

US 2009/0111557 A1 Apr. 30, 2009

(51) Int. Cl.
*G06F 17/00* (2006.01)
*G06F 19/00* (2006.01)

(52) U.S. Cl. ............ 463/20; 463/16; 463/25; 273/138.1

(58) Field of Classification Search .............. 463/16–20, 463/25, 29; 273/138.1, 139
See application file for complete search history.

(56) References Cited

U.S. PATENT DOCUMENTS

| | | | | |
|---|---|---|---|---|
| 5,833,537 | A * | 11/1998 | Barrie | 463/21 |
| 6,004,207 | A | 12/1999 | Wilson et al. | |
| 6,120,378 | A * | 9/2000 | Moody et al. | 463/20 |
| 6,561,904 | B2 * | 5/2003 | Locke et al. | 463/25 |
| 6,569,013 | B1 * | 5/2003 | Taylor | 463/13 |
| 6,612,927 | B1 * | 9/2003 | Slomiany et al. | 463/16 |
| 6,638,164 | B2 * | 10/2003 | Randall et al. | 463/20 |
| 6,926,607 | B2 * | 8/2005 | Slomiany et al. | 463/20 |
| 6,971,954 | B2 | 12/2005 | Randall et al. | |
| 7,147,559 | B2 | 12/2006 | Englman | |
| 7,160,190 | B2 | 1/2007 | Baerlocher et al. | |
| 7,740,245 | B2 * | 6/2010 | Tarantino | 273/292 |
| 2002/0022514 | A1 * | 2/2002 | Randall et al. | 463/20 |
| 2002/0082074 | A1 * | 6/2002 | Bennett | 463/20 |
| 2003/0027626 | A1 | 2/2003 | Marks et al. | |
| 2003/0054875 | A1 * | 3/2003 | Marks et al. | 463/20 |
| 2003/0060259 | A1 * | 3/2003 | Mierau et al. | 463/16 |
| 2003/0162585 | A1 | 8/2003 | Bigelow et al. | |
| 2003/0216165 | A1 * | 11/2003 | Singer et al. | 463/20 |
| 2003/0216170 | A1 * | 11/2003 | Walker et al. | 463/25 |
| 2004/0082373 | A1 * | 4/2004 | Cole et al. | 463/13 |
| 2004/0087359 | A1 | 5/2004 | Cuddy et al. | |
| 2004/0142740 | A1 | 7/2004 | Damico et al. | |
| 2004/0195773 | A1 * | 10/2004 | Masci et al. | 273/317 |

(Continued)

OTHER PUBLICATIONS

Casino Technology, "Lady Fortune", <http://casino-technology.com/592%7C536>, downloaded Jul. 2, 2007, 2 pages.

(Continued)

*Primary Examiner* — Melba Bumgarner
*Assistant Examiner* — Milap Shah
(74) *Attorney, Agent, or Firm* — Lewis and Roca LLP

(57) ABSTRACT

A video slot game is described that increases a multiplier associated with each active pay line of the game independently of the multipliers associated with other pay lines of the game. Each line multiplier acts to multiply the winnings based on that particular line only. A multiplier for a particular line may be incremented for a current spin based on a wager outcome on that line in an immediately previous spin. A line multiplier may continue to increase as long as the player continues to win on that line. The increased line multiplier may have the side effect of acting as an incentive for a player to keep playing the game of chance, so as not to leave an unused line multiplier for another player. According to one variation, if the player does not win on a particular line, then the multiplier associated with that particular line may revert to a default level.

24 Claims, 23 Drawing Sheets

U.S. PATENT DOCUMENTS

| | | | | |
|---|---|---|---|---|
| 2004/0266517 | A1* | 12/2004 | Bleich et al. | 463/20 |
| 2005/0037836 | A1 | 2/2005 | Gilmore et al. | |
| 2005/0101373 | A1* | 5/2005 | Mierau et al. | 463/20 |
| 2005/0250578 | A1 | 11/2005 | Slomiany et al. | |
| 2006/0121978 | A1* | 6/2006 | Hornik et al. | 463/20 |
| 2006/0199632 | A1* | 9/2006 | Thomas et al. | 463/16 |
| 2007/0060248 | A1* | 3/2007 | Rodgers et al. | 463/16 |
| 2007/0287532 | A1* | 12/2007 | Jackson | 463/25 |
| 2008/0311973 | A1* | 12/2008 | Jaffe | 463/20 |
| 2009/0108526 | A1* | 4/2009 | Moody | 273/274 |
| 2009/0111556 | A1* | 4/2009 | Moody | 463/20 |
| 2009/0124326 | A1* | 5/2009 | Caputo et al. | 463/20 |

OTHER PUBLICATIONS

IGT, "Twice Your Honey Video Slots", <http://www.igt.com/GamingGroup/Games/game_detail.asp?toggle=ovr...>, downloaded Oct. 24, 2007, 1 page. Admitted Prior Art.

* cited by examiner

FIG. 10
TOUCH TO CHANGE
CREDIT
2159
BET
15
WIN
Good Luck
CONGRATULATIONS!
YOU WON
5
FREE SPINS
HELP
STOP
CONSECUTIVE WINS
ON THE SAME PAYLINE
INCREASES MULTIPLIER!

FIG. 17
"HOT ELECTRIC QUEUES" FREE SPINS BONUS
3 OR MORE ON A PLAYED LINE AND ON CONSECUTIVE REELS, BEGINNING WITH
THE FAR LEFT REEL, INITIATES THE "HOT ELECTRIC QUEUES" FREE SPINS BONUS!
ELECTRIC QUEUE PAYLINE MULTIPLIERS STAY ON, AND INCREASE IN MULTIPLES OF 5 WITH EACH LINE WIN!
BONUS GAMES WON ON AN ACTIVE ELECTRIC QUEUE STARTS ALL PAYLINES IN THE "HOT ELECTRIC QUEUES" BONUS
WITH THE WINNING MULTIPLIER VALUE!
WINS 15 FREE SPINS.
WINS 10 FREE SPINS.
WINS 5 FREE SPINS.
FREE SPINS ARE PLAYED AT THE SAME LINE BET AS THE INITIATING GAME.
BACK
NEXT
RETURN TO GAME

FIG. 22
"HOT ELECTRIC QUEUES" FREE SPINS BONUS
3 OR MORE ON A PLAYED LINE AND ON CONSECUTIVE REELS, BEGINNING WITH
THE FAR LEFT REEL, INITIATES THE "HOT ELECTRIC QUEUES" FREE SPINS BONUS!
ELECTRIC QUEUE PAYLINE MULTIPLIERS STAY ON, AND INCREASE IN MULTIPLES OF 5 WITH EACH LINE WIN!
WINS 10 FREE SPINS.
WINS 5 FREE SPINS.
WINS 3 FREE SPINS.
FREE SPINS ARE PLAYED AUTOMATICALLY. ADDITIONAL FREE SPINS MAY BE AWARDED DURING THE BONUS AND ARE ADDED TO THE SPINS REMAINING METER. THE BONUS ENDS WHEN 0 FREE SPINS REMAIN OR AFTER 30 FREE SPINS HAVE BEEN PLAYED. VALUES ON THE BONUS SCREEN HAVE BEEN MULTIPLIED BY THE INITIATING LINE BET. ONLY ONE "HOT ELECTRIC QUEUES" FREE SPINS BONUS CAN BE AWARDED PER GAME. MALFUNCTION VOIDS ALL PLAYS AND PAYS.
BACK
NEXT
RETURN TO GAME

SLOT MACHINE GAME HAVING INDIVIDUAL LINE-WIN MULTIPLIERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention relates generally to games of chance and video gaming machines. More specifically, the invention provides various methods and systems for a game of chance illustratively embodied in a video gaming machine, whereby the game may be based on an arrangement of symbols.

BACKGROUND

Gaming establishments (e.g., casinos) rely heavily on games and video gaming devices as a substantial source of income. In regulated gaming jurisdictions, e.g., Las Vegas, Nev., gaming regulations dictate the minimum levels that a video gaming device must payout, as a percentage of money wagered by players playing the machine, e.g., 90% minimum. Thus, if a machine is said to pay 95%, then the machine pays at least $0.95 in winnings for every $1.00 wagered in the machine. While the profit ratio appears slim, casinos principally rely on the volume of money played for profits. Because each video gaming machine can be considered a relatively fixed cost (maintenance and IP licenses represent minimal ongoing costs), the more money played in each machine, the more a casino's profits.

As the popularity of video games grows, and as more types of games are offered in the marketplace, video game/gaming developers must provide innovative types of games to maintain a player's interest in a given video gaming machine. Further, in order to maximize profit, casinos are continually seeking new and innovative games to keep players' interest, lest the player wander off into someone else's casino. Thus, there is a continual need in the art to provide new game play methods, bonuses, mini-games, payout methodology, and the like in video gaming devices to maintain player interest.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present invention increase a multiplier associated with each active pay line of a video slot machine independently of the multipliers associated with other pay lines of the video slot machine. A line multiplier acts to multiply the winnings based on that particular pay line only. A multiplier for a particular pay line may be incremented for a current spin based on a wager outcome on that pay line in an immediately previous spin. Stated another way, a multiplier for a particular pay line may be incremented for an immediately subsequent spin based on the wager outcome on that pay line during a current spin. The increased line multiplier may have the side effect of acting as an incentive for a player to keep playing the game of chance. The multiplier associated with a pay line may continue to increase as long as the player continues to win on that pay line. According to some aspects, if the player does not win on a particular pay line, then the multiplier associated with that particular pay line may revert to a default level.

An illustrative embodiment of the invention provides a slot machine method that increases a pay line multiplier independently of the outcome on other pay lines. A slot machine visually depicts on a display screen a symbol display area comprising a plurality of symbol locations, e.g., a 5 column by 3 row playing field. The slot machine identifies a plurality of pay lines, each pay line comprising a unique ordered proper subset of the plurality of symbol locations, and where each pay line has a corresponding line multiplier. For example, each pay line might include one of the three symbols in each of the five columns. The slot machine stores a player wager that includes the players selection of active pay lines (i.e., those pay lines on which the player is wagering), and also includes a wager amount per active pay line. The slot machine determines a game outcome by displaying one of a plurality of symbols in each of the plurality of symbol locations, e.g., randomly, pseudo-randomly, randomly based on weights associated with each symbol, based on symbol locations on virtual "reels," etc. For each active pay line, the slot machine determines a line payout based on a comparison of its unique ordered proper subset of symbol locations to a pay table, and further based on the wager amount per pay line, and further multiplied by its corresponding line multiplier, and credits all line payouts to the player. In addition, for each active pay line on which the player wins, the slot machine increments that pay line's corresponding line multiplier for an immediately subsequent game/spin, independent of the line payout based on all other pay lines.

According to some aspects of the invention, a line multiplier may be reset to a default level when the player does not win on the corresponding pay line.

According to another aspect of the invention, a player may earn one or more free spins as part of a bonus feature or bonus round. During the bonus round, the line multipliers might not be reset regardless of whether the player wins or loses on each pay line during each free spin, such that a line multiplier can only increase during the bonus round, based on the player winning on a corresponding pay line.

According to yet another aspect, if, based on a particular pay line, a player wins one or more free spins of the bonus feature, all pay line multipliers within the bonus feature may initially be set to the value of the line multiplier corresponding to the pay line in which the player won the one or more free spins.

Another variation of the invention includes a similar alternative method, whereby a slot machine, for each active pay line on which the player won in an immediately previous game, increments that pay line's corresponding line multiplier for a current game.

The above and other illustrative aspects may be embodied in a data processing system, video slot machine, computer system, mobile device, computer storage media, etc.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
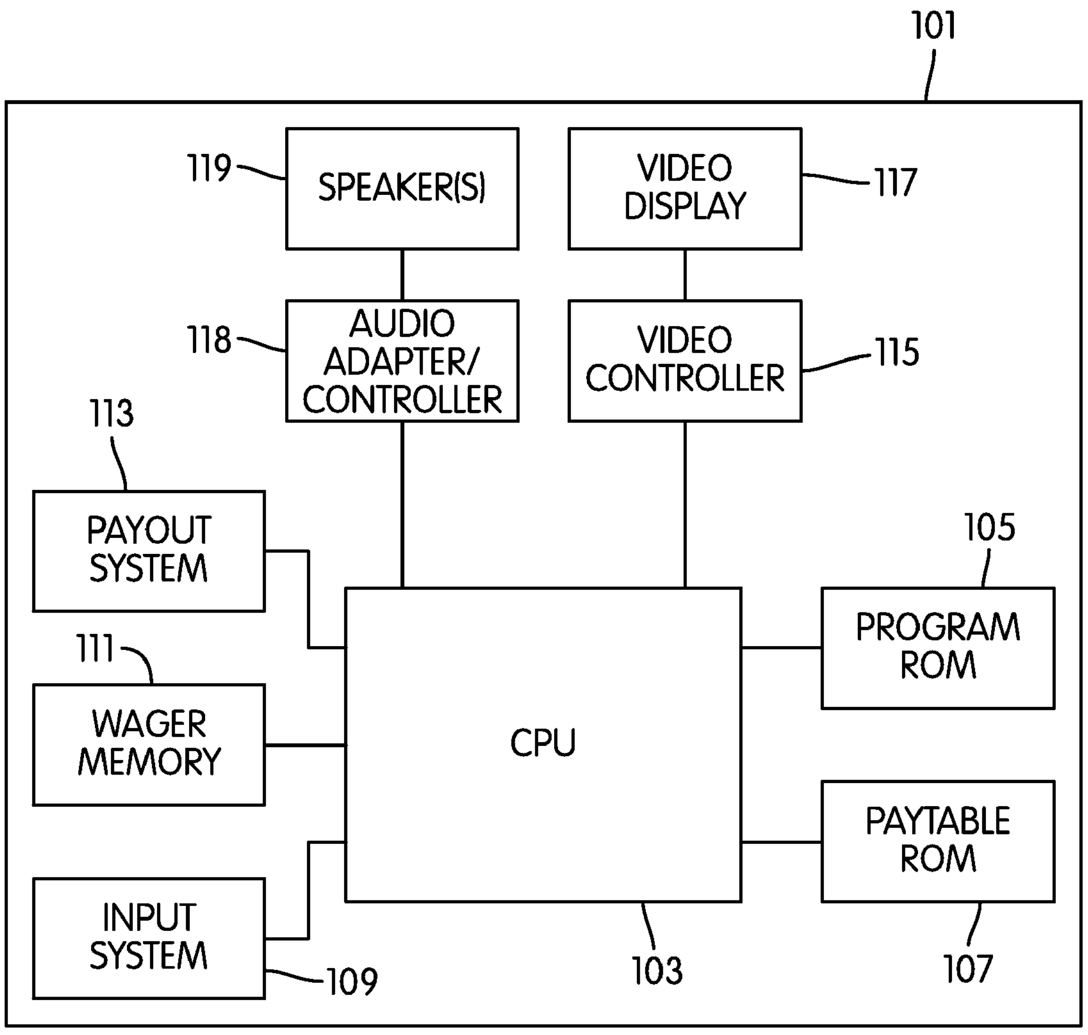
FIG. 1 illustrates an example of a hardware architecture in which one or more aspects of the invention may be embodied.

FIG. 1 provides an example of a hardware architecture in which one or more aspects of the invention may be embodied. Video gaming device 101 may be, in this example, a video slot machine, such as is found in any gaming jurisdiction. Video gaming device may include a CPU 103 controlling overall operation of the video gaming device based on instructions stored in program ROM 105 and pay-table ROM 107. Program ROM 105 stores executable instructions describing the behavior of the video gaming device, to be executed by CPU 103 to control operation of the video gaming device 101. Pay-table ROM 107 stores payout information based on various outcomes of the video gaming device. An example of pay table information according to an embodiment of the invention is illustrated in readable form in FIGS. 13-23. Odds of winning may vary, based on desired payout percentages that are determined, for example, by a proprietor of the video slot machine, by jurisdictional regulations, or based on other factors.

CPU 103 may be connected to a video controller 115, which provides visual output to one or more video displays 117. CPU 103 may also provide audio output through one or more speakers 119 via an audio adapter or controller such as audio adapter/controller 118. Audio and video output may vary depending on the specific manner and method in which aspects of the invention are embodied in video gaming device 101, as will be appreciated upon reading further details below and with reference to the additional figures.

Input system 109 may include one or more buttons, toggles, switches, levers, coin/token slots, paper money/ticket receivers, magnetic card reader, touch-sensitive display screen(s) and the like, through which a player can deposit money into the video gaming device 101, review help and instructional information, select wager amounts, select pay lines, start and stop a game, make selections during a game (e.g., in a bonus round), decide to cash out, etc. Wager memory 111 stores a current amount of money deposited by the player into the video gaming device 101, and may also store current wager information input by the player, e.g., number of lines played, bet per line, etc. Payout system 113 may include a coin/token dispenser, paper money/ticket dispenser, or any other device through which a user can withdraw money from video gaming device 101.

Video gaming device 101 is illustrative only. As used herein, the term "video gaming device" may refer to any data processing device, whether a computer, video slot machine, mechanical slot machine, mobile telephone, personal digital assistant, MP3 player, client-server architecture, and the like, on which a game of chance as described herein may be stored, implemented, and/or executed. For example, one or more aspects of the invention may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, ROM, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
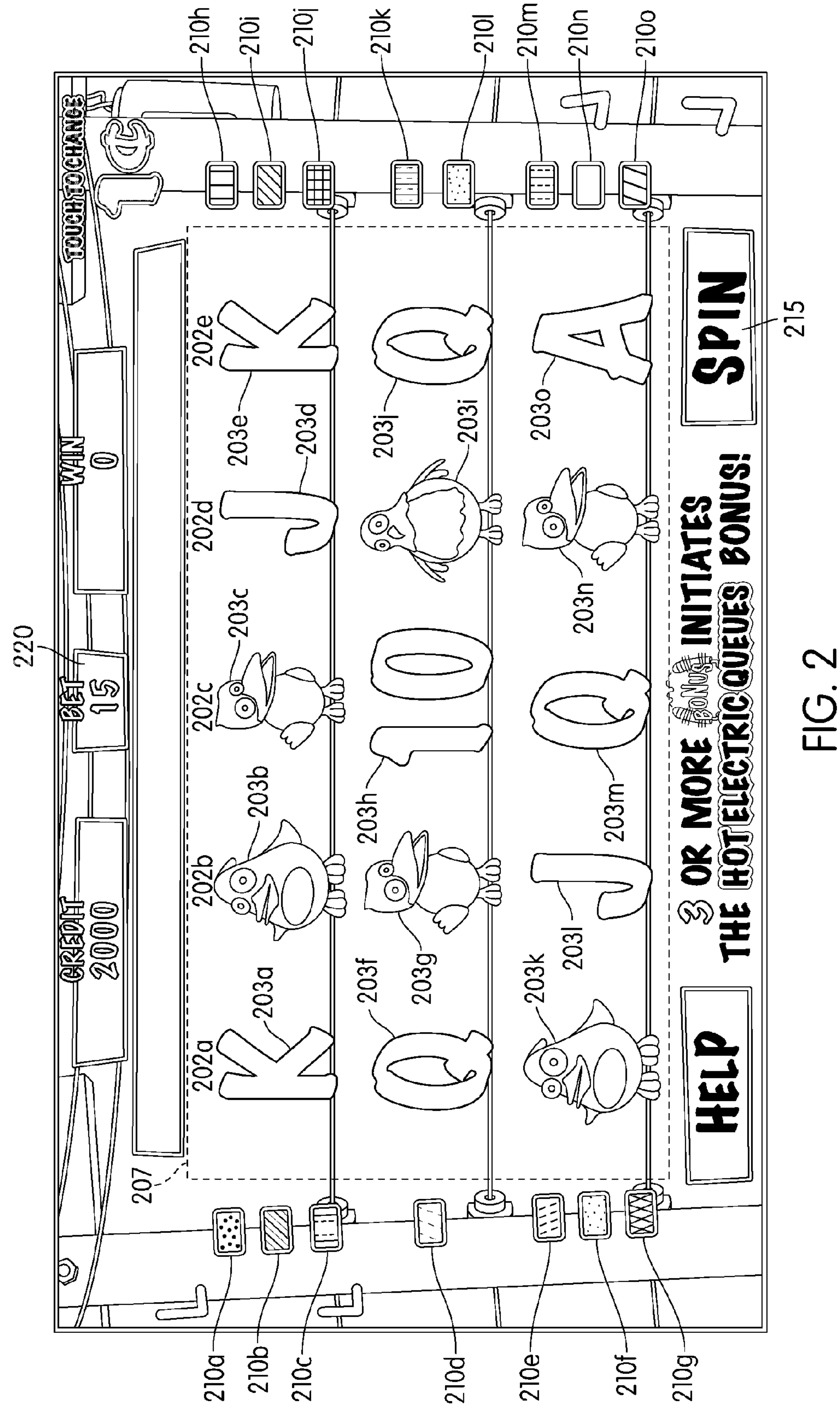
FIG. 2 illustrates a screen shot of a video slot machine interface according to one or more illustrative aspects of the invention.
Figure 15:
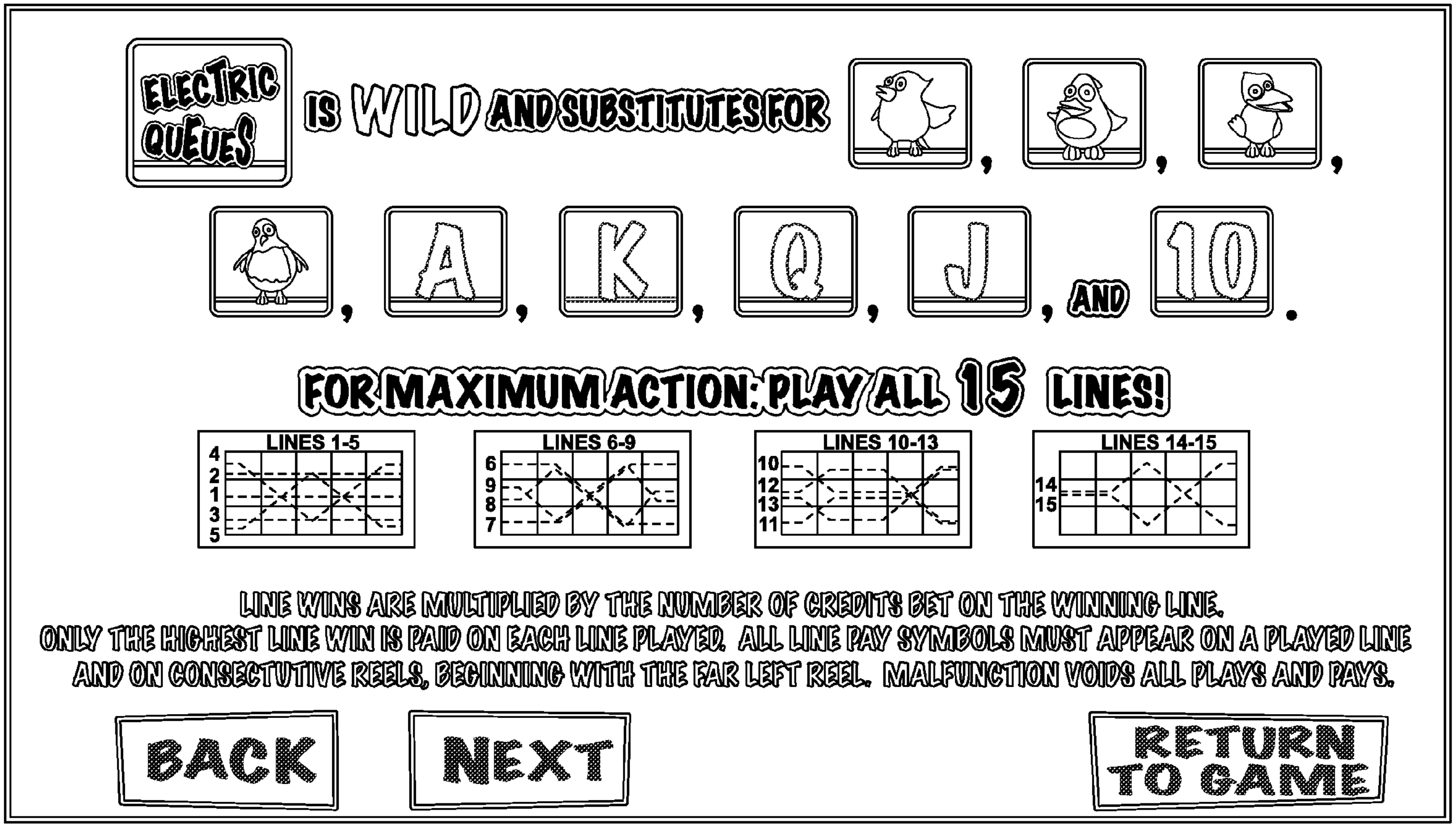
FIG. 15 illustrates a screen shot of a video slot machine according to one or more illustrative aspects of the invention.
Figure 16:
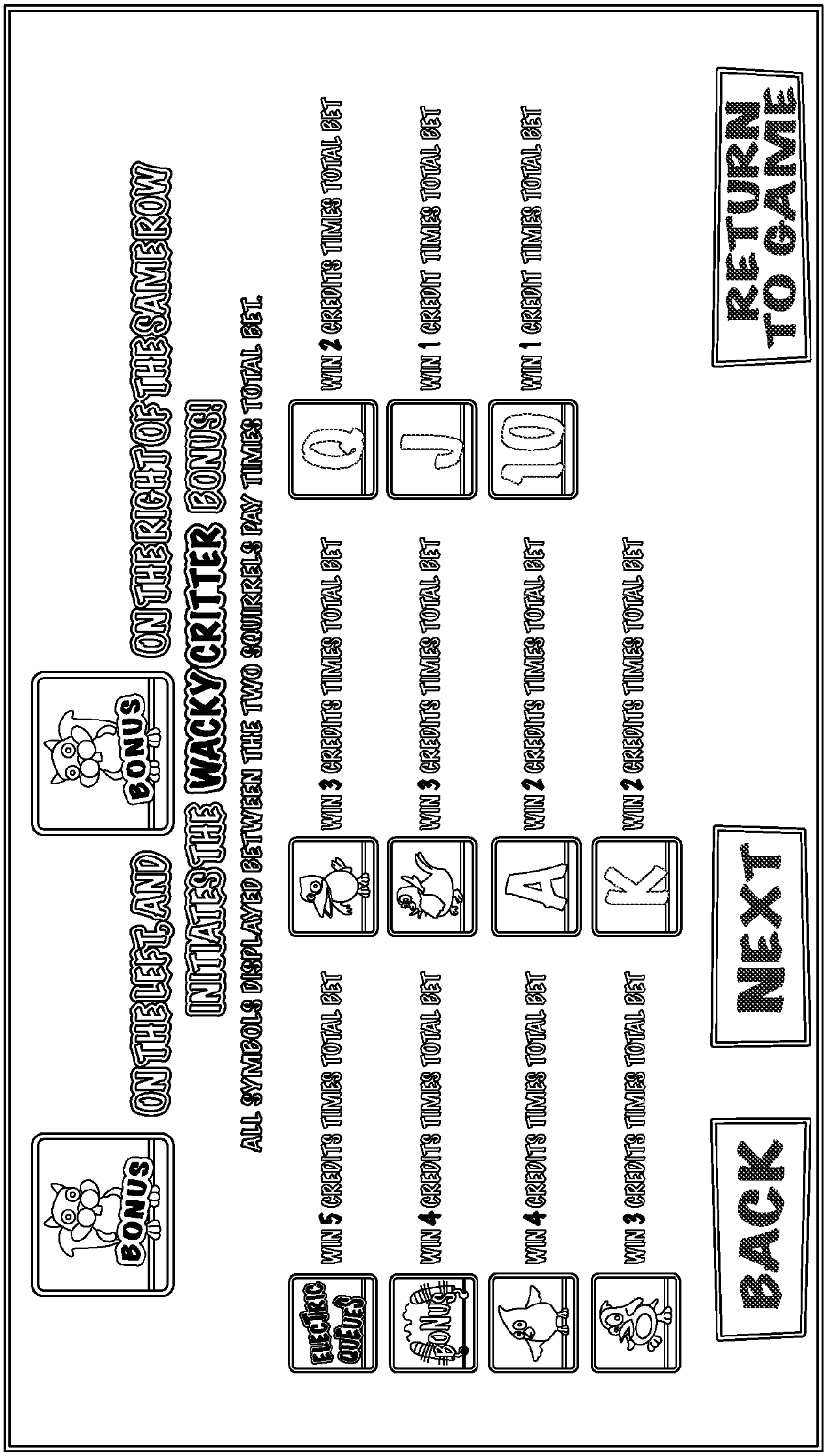
FIG. 16 illustrates a screen shot of a video slot machine according to one or more illustrative aspects of the invention.
Figure 17:
FIG. 17 illustrates a screen shot of a video slot machine according to one or more illustrative aspects of the invention.
Figure 18:
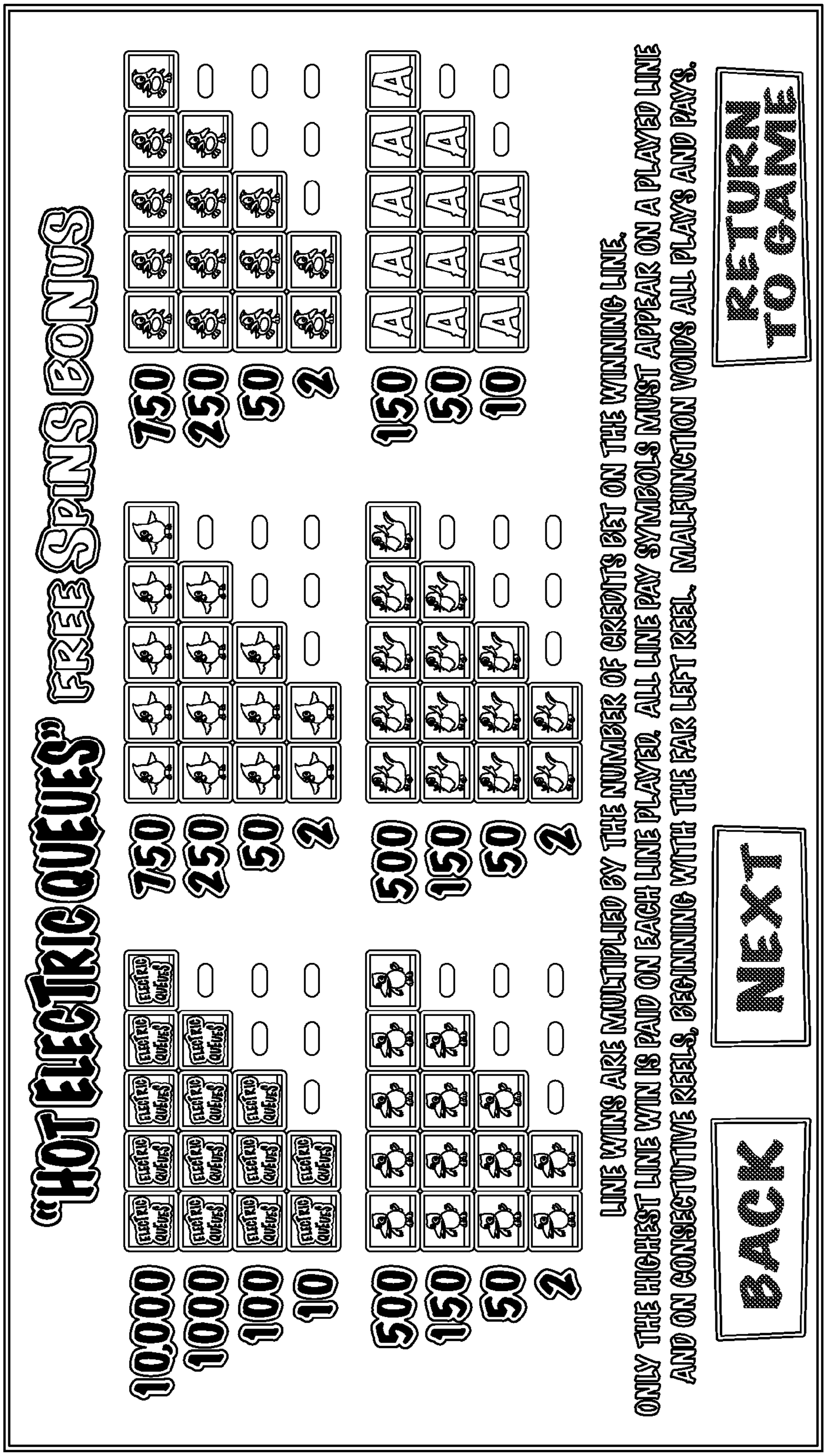
FIG. 18 illustrates a screen shot of a video slot machine according to one or more illustrative aspects of the invention.
Figure 19:
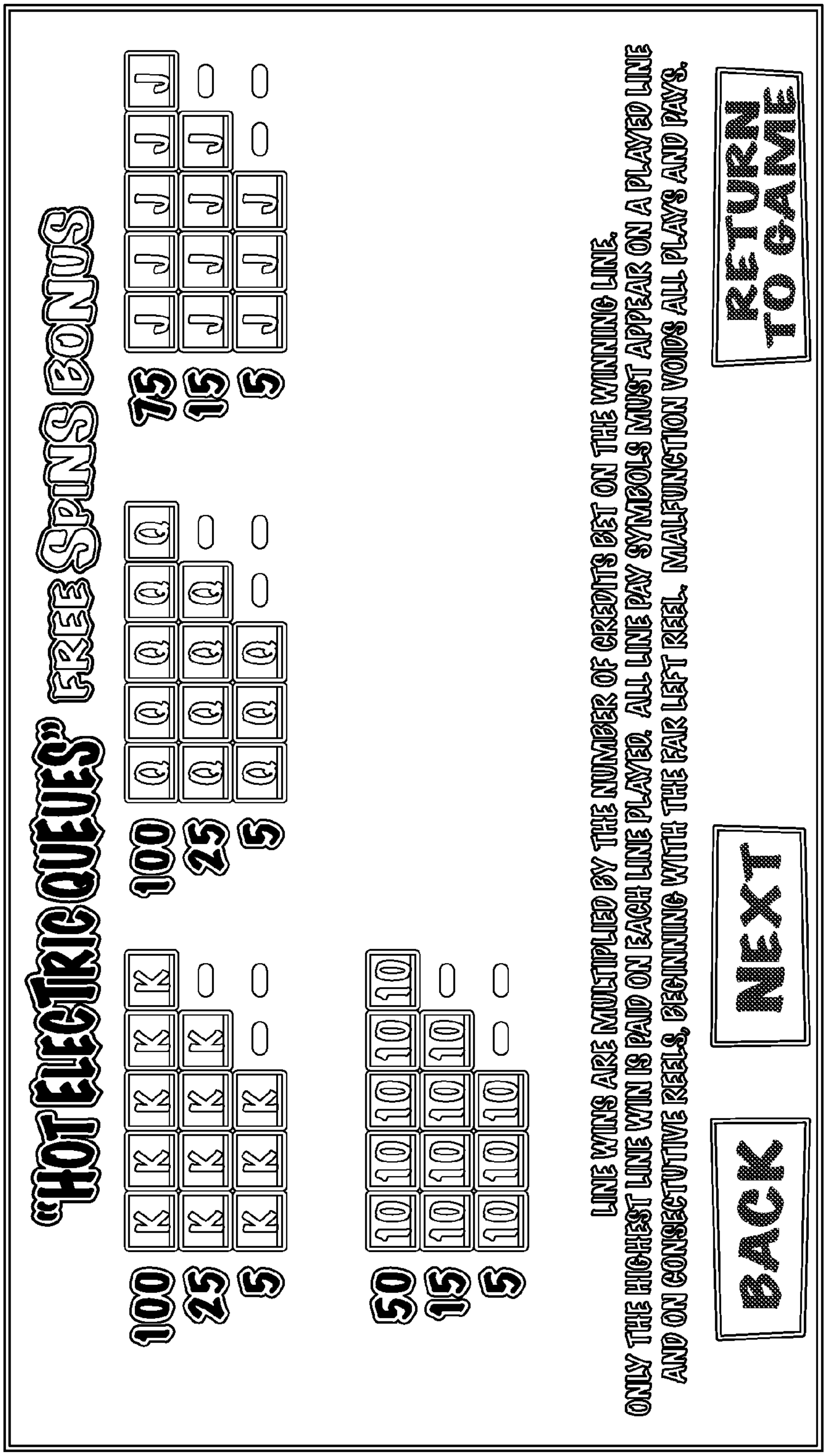
FIG. 19 illustrates a screen shot of a video slot machine according to one or more illustrative aspects of the invention.
Figure 20:
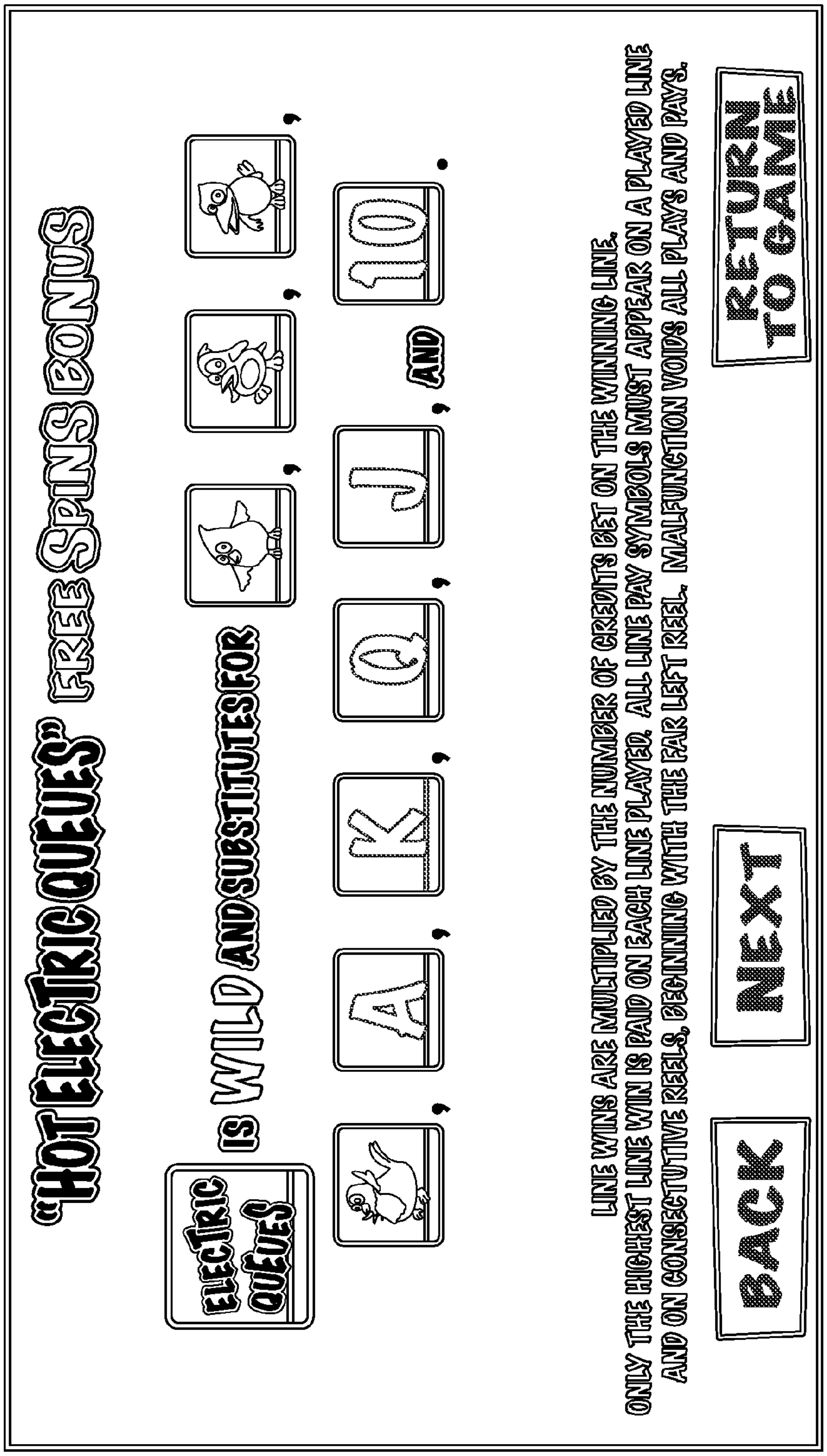
FIG. 20 illustrates a screen shot of a video slot machine according to one or more illustrative aspects of the invention.
Figure 21:
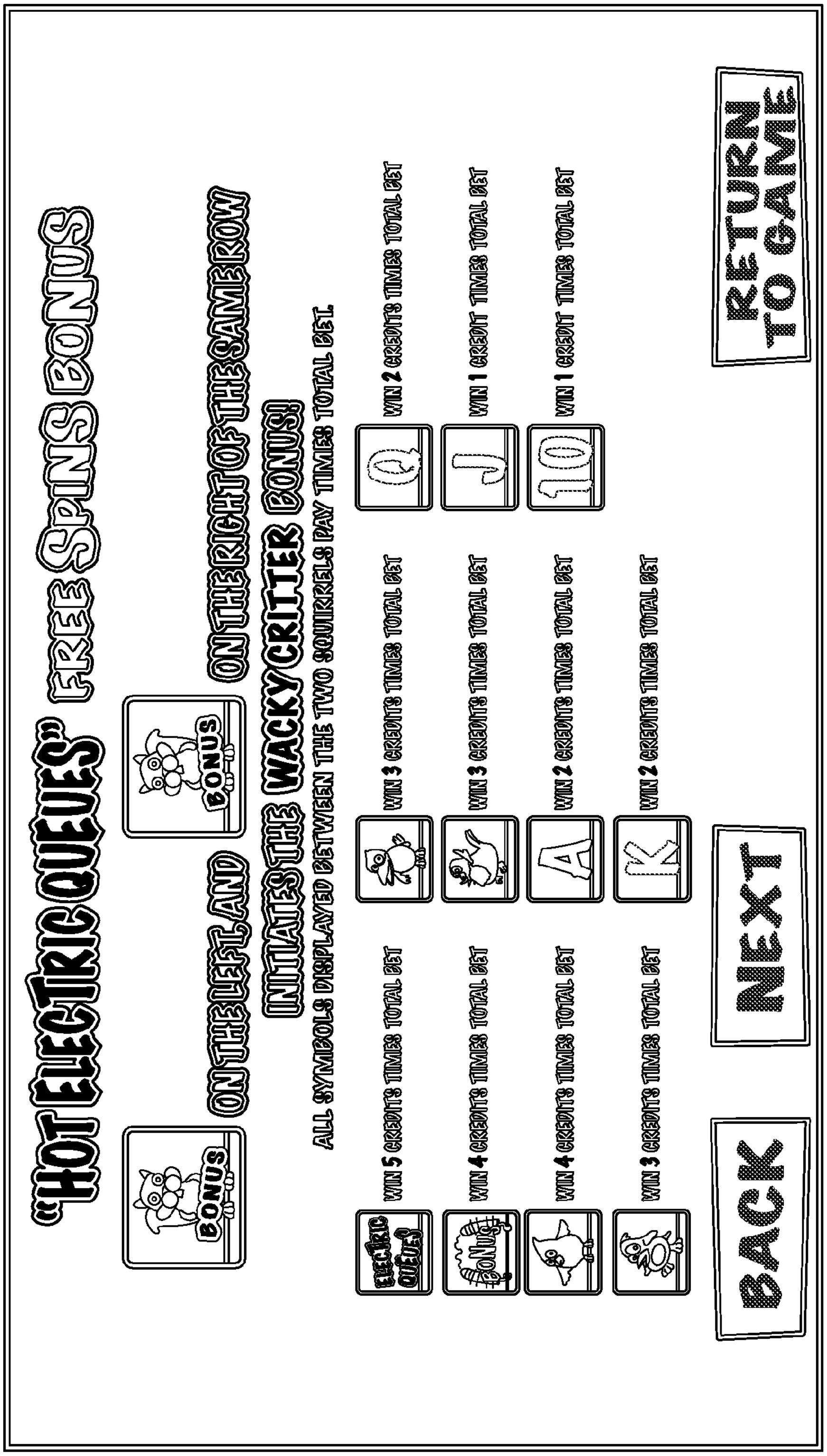
FIG. 21 illustrates a screen shot of a video slot machine according to one or more illustrative aspects of the invention.
Figure 22:
FIG. 22 illustrates a screen shot of a video slot machine according to one or more illustrative aspects of the invention.
Figure 23:
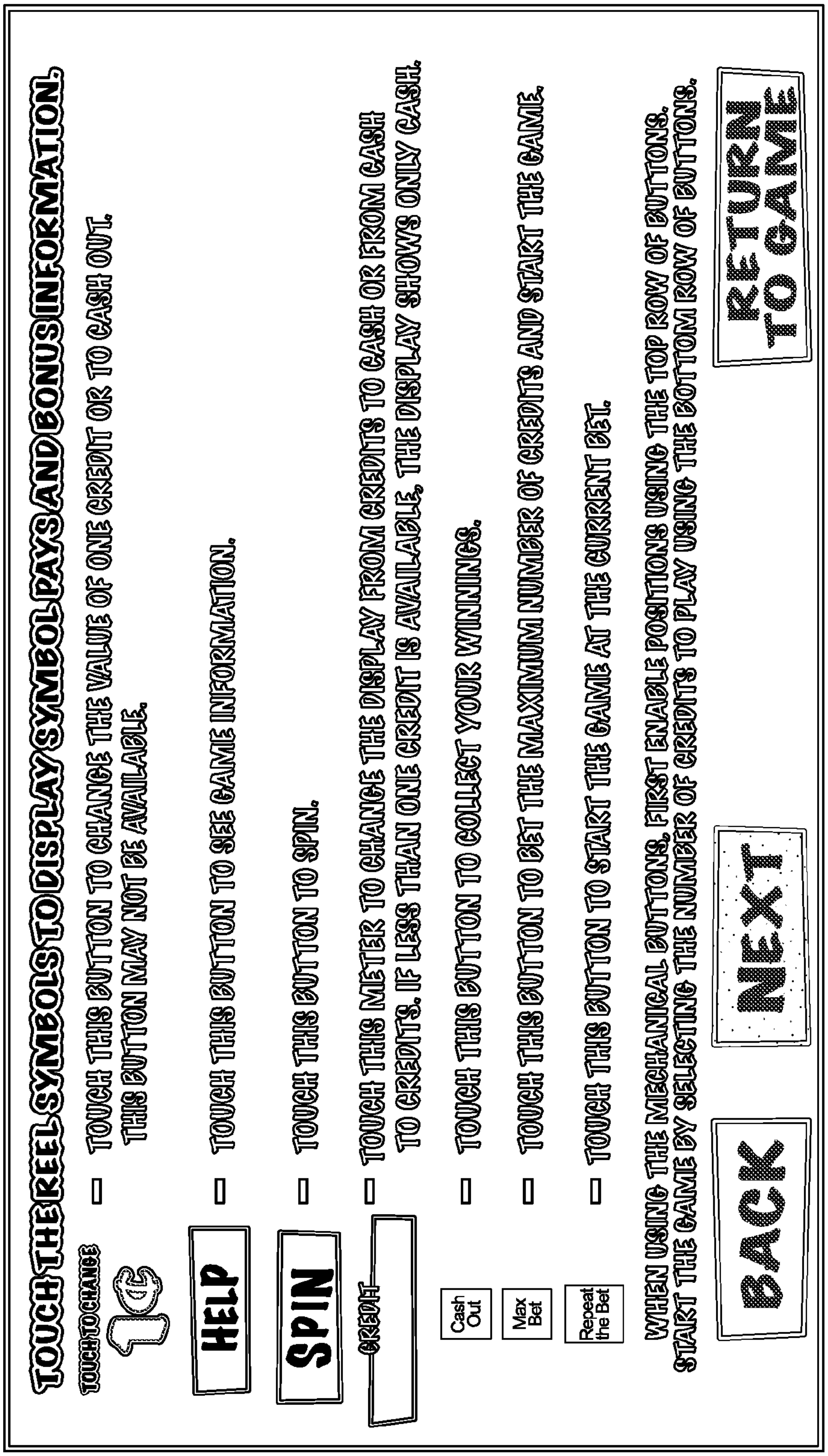
FIG. 23 illustrates a screen shot of a video slot machine according to one or more illustrative aspects of the invention.

Typical slot machines spin a predefined number of reels and determine a payout based on the types and static arrangement of symbols that appear on the reels after being spun. In particular, predefined payout patterns may be used to evaluate whether a given row or line path of symbols corresponds to a winning arrangement. FIG. 2 illustrates a video slot machine screen having a plurality of reels or vertical columns 202 (202_a-e_) and a plurality of symbols 203 (203_a-o_) in a predefined play area 207. Pay lines 210 (210_a-o_) may be visually defined to identify to a player the relevant symbols being evaluated in determining a payout, or pay line information may be provided separately, e.g., on a Help screen or screens as illustrated in FIG. 15. A pay line, as used herein, refers to a combination of symbol locations used in determining a payout outcome based on the symbols present in the combination of symbol locations after a spin. For example, symbols 203_f_, 203_g_, 203_h_, 203_i_, and 203_j_ comprising pay line 210_d_ may be compared to a predefined payout pattern to determine whether a match exists. If so, a payout amount may be added to a player's balance. In some instances, a symbol orientation or arrangement (e.g., the order of symbols from left to right) may also be determinative of whether a match exists. Thus, while pay line 210_d_ may match a predefined pattern, reversing the order of the symbols comprising pay line 210_d_ from left to right might not be considered a match. Traditional slot machines also permit a player to selectively add and/or subtract the number of pay lines in play, up to some predetermined maximum and/or minimum number. The addition of more pay lines may cost more to play while reducing the number of pay lines may reduce the cost. As the cost to play changes, so may the payout. However, the more pay lines the player plays, there is generally a higher likelihood of return on investment to the player. Pay lines typically comprise one symbol per reel, but need not necessarily be so limited. Any ordered or unordered subset of symbol locations may be used as a pay line.

A "spin" of a video slot machine, as used herein, refers to one play, or one game, of the video slot machine based on a player wager. The player wager includes at least two elements: a number N of lines on which to wager, and a wager amount A per line (also referred to herein as a line wager). With respect to the number N of pay lines on which to wager, the player can select whether to play 1 pay line, 2 pay lines, 3 pay lines, etc. up to some maximum number of pay lines, e.g., fifteen pay lines. Alternatively, the player may be forced to select between predetermined numbers of pay lines, e.g., 1, 3, 5, 10, 15 pay lines. A pay line is said to be active if it is included within the pay lines wagered on by the player for a given spin. The second element of the wager is the amount A to wager per pay line, e.g., $0.01, $0.02, $0.05, $0.10, $0.25, $0.50, $1, $2, $5, etc., or any other monetary denomination per pay line. Typically the line wager is the same for all pay lines selected by the player; however, the line wager may differ per pay line in some embodiments. The total amount W of the player wager can be calculated as W=N*A. After the player wager W is determined and fixed, the video slot machine determines the outcome by spinning its virtual "reels" or otherwise randomly determining the symbols for each symbol location 203_a_-203_o_ in the field of play 207, and comparing the symbols to the pay table to determine whether each active pay line matches a predefined winning combination of symbols.

Aspects of the present invention increase a multiplier associated with each active pay line for a current spin based on a previous spin. Each pay line that a player wins on during a particular spin receives an increased line multiplier for a subsequent spin, preferably the immediately subsequent spin. The increased line multiplier has the side effect of acting as an incentive for the player to keep playing the game of chance. On the subsequent spin, if the player wins again on that pay line, the line multiplier may again increase. However, if the player does not win again on that pay line, then the multiplier may revert to a default level, for example, 1×. If the player wins on a different pay line during the subsequent spin, then the line multiplier for that different pay line increases for the next immediately subsequent spin. The line multiplier acts to multiply the winnings based on that particular pay line. Each pay line may have a default line multiplier of 1, or 1 times the winnings based on that line, referred to as 1×. The line multipliers may increase in designated increments, such as by 1, by 5, or in some other predetermined pattern, e.g., 1×, 5×, 10×, 15×, etc.

Figure 3:
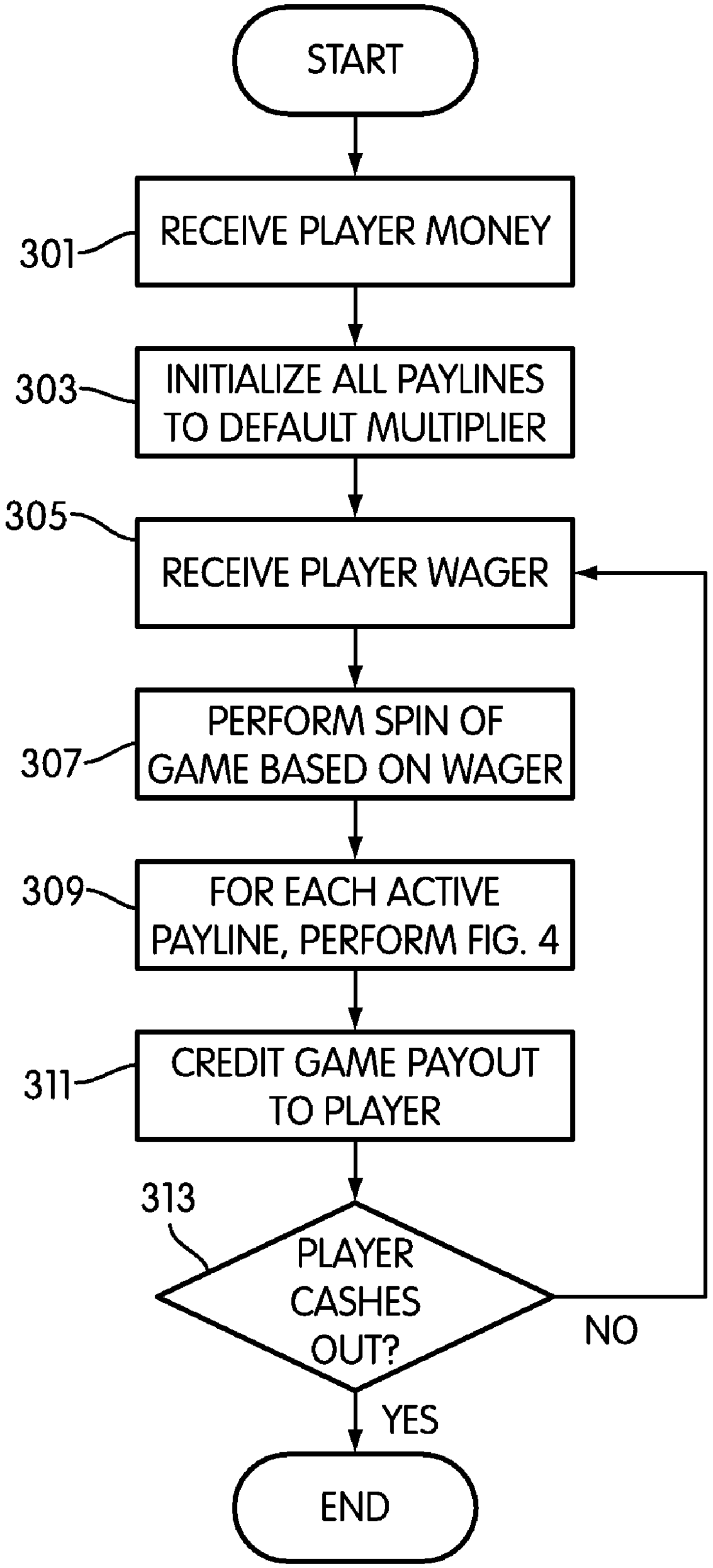
FIG. 3 is a flow chart of a method for performing a video slot machine spin according to one or more illustrative aspects of the invention.
Figure 4:
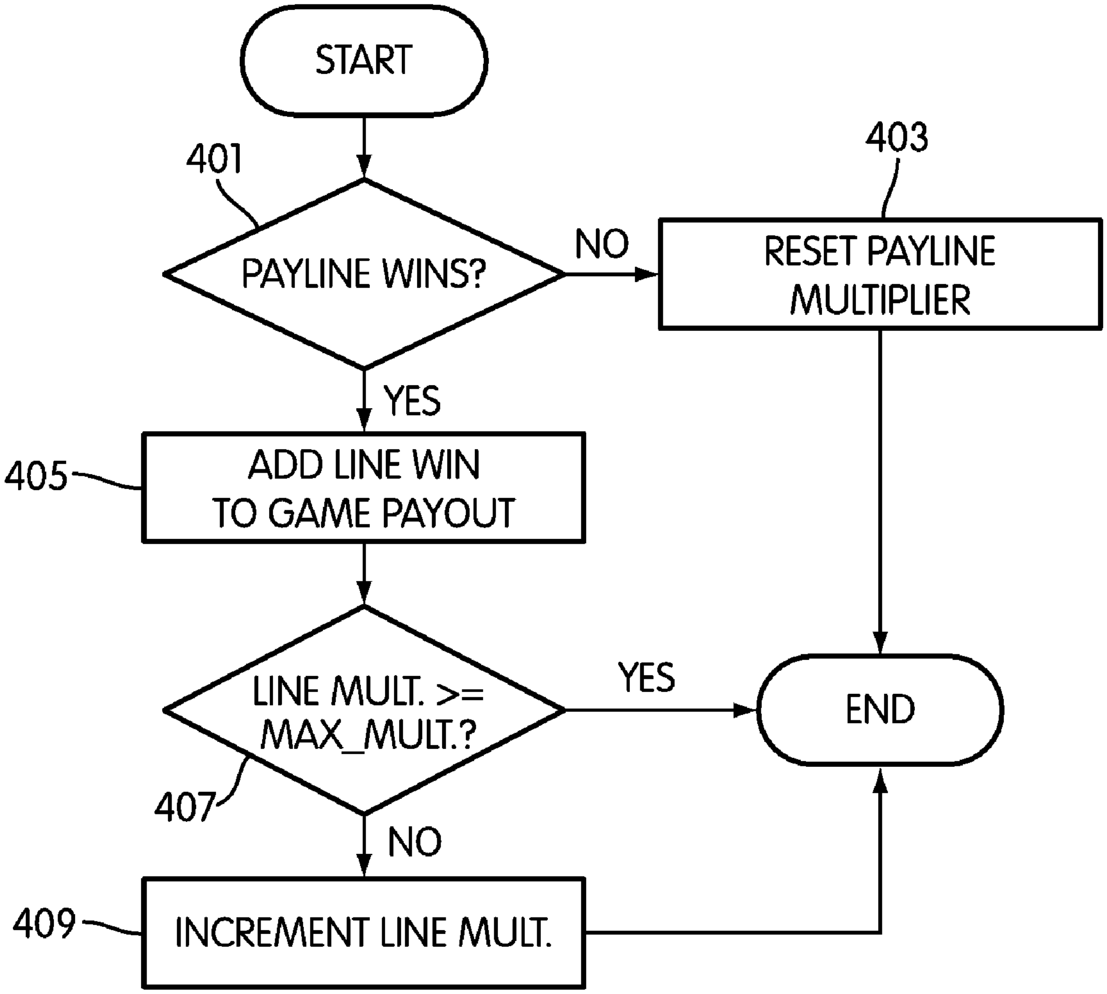
FIG. 4 is a flow chart of a method for increasing a pay line multiplier in a video slot machine game according to one or more illustrative aspects of the invention.

FIGS. 3 and 4 illustrate a method of playing a video slot machine game of chance including increasing line multipliers according to one or more aspects of the invention. Initially, in step 301, video slot machine 101 receives and/or credits money to a player account. The money may be input via a paper money receiver, coin input, or via other money input systems as are known in the art now or developed in the future. The credit may be stored in a temporary memory in video slot machine 101, in a central server location, or in other computer memory. In step 303 the video slot machine initializes the line multipliers for all pay lines to their default level, e.g., 1×. That is, the video slot machine 101 may initialize all line multipliers each time a new player begins playing the video slot machine. However, in other embodiments, a previous player may have decided to cash out after winning a large jackpot, which would have resulted in an increased line multiplier for the line or lines on which the jackpot was based. In such a scenario, the increased line multiplier may still be associated with one or more pay lines, and thus, the subsequent player can take advantage of the previous player's decision to cash out after a winning spin by starting out with an increased line multiplier on one or more pay lines.

In step 305 the video slot machine determines the player wager, including the number of active pay lines and the wager amount per pay line based on user input, e.g., using input buttons on the video slot machine, soft buttons displayed on the screen 117 (FIG. 1), or using other input techniques. When the user has finalized his or her wager, the player indicates as much by selecting a "spin" button or similar input on the video slot machine. The video slot machine then performs one spin in step 307 to determine the symbols that will reside in each position 203_a_-203_o_ of the field of play 207 (FIG. 2). The video slot machine 101 determines, in step 309, the payout to pay to the user by performing subroutine steps 401-409 (FIG. 4) for each active pay line. After adding up the line-based payouts calculated in steps 401-409 (discussed below) for each pay line, the video slot machine 101 in step 311 credits the game payout amount to the player's account or tab. The method ends if the player decides to cash out in step 313, otherwise the method returns to step 305 to determine the player's next wager.

FIG. 4 illustrates a subroutine used by the video slot machine to calculate line payout amounts and to increase line multipliers. Initially, in a first iteration of step 401, video slot machine 101 checks a current active pay line, e.g., pay line 210_a_, to determine whether the player wins based on the wager against that pay line. To determine whether the player wins, the video slot machine 101 compares the symbols comprising the current pay line against information stored in a pay table, e.g., against the information illustrated in FIGS. 13-23 as stored in pay table ROM 107. Based on the comparison, if the player does win on the current pay line, the video slot machine also determines how much the player wins based on the current pay line and the wager amount per pay line. The amount the player wins based on a single pay line is referred to herein as the line win amount. The total of all line win amounts for a single spin is referred to herein as the game payout.

If the player wins on the current pay line, the video slot machine 101 in step 405 adds the line win amount to the game payout, and in steps 407-409 increments the line multiplier for the current pay line when the line multiplier is not greater than or equal to some maximum line multiplier amount. For example, if the line multiplier for the current line was previously 1×, the video slot machine 101 may increment the line multiplier for the current line to 5×. If the line multiplier for the current line was previously 5×, the video slot machine 101 may increment the line multiplier for the current line to 10×. Video slot machine 101 may increment the line multiplier according to any predetermined algorithm. For example, in one embodiment the line multiplier may increase by one for each consecutive win, i.e., 1× (default), 2×, 3×, . . . , 10× (maximum). According to another embodiment, the line multiplier may increase to the next multiple of five for each consecutive win, i.e., 1× (default), 5×, 10×, 15×, . . . , 50× (maximum). The maximum line multiplier is optional, and may be omitted from some embodiments. In such a scenario video slot machine 101 relies on the decreasing odds of consecutive wins on the same pay line to eventually revert the line multiplier for that pay line to the base or default level. After incrementing the line multiplier for the current line (or determining that a maximum line multiplier has been reached), video slot machine 101 increments the current pay line to a next active pay line and restarts the subroutine of FIG. 4 at step 401 for the new current pay line.

However, referring back to step 401, if the player does not win on the current pay line, the video slot machine 101 in step 403 resets the line multiplier for the current pay line to a default level, e.g., 1×. Video slot machine 101 then increments the current pay line to a next active pay line and restarts the subroutine of FIG. 4 with step 401 for the new current pay line. If there are no remaining active pay lines, video slot machine returns to step 309 and progresses to step 311, as discussed above.

While the above discussion is with respect to active pay lines, video slot machine 101 may automatically revert line multipliers for inactive pay lines to the default level, such that when an inactive pay line is subsequently selected by a player, i.e., made an active pay line, that pay line will start with the base or default line multiplier corresponding to it. Alternatively, video slot machine 101 might only revert a line multiplier to the base/default level when a player plays but does not win on that pay line. In such a scenario, when the inactive pay line is subsequently activated (e.g., as a result from a player playing that pay line), the previous line multiplier is still used instead of reverting the line multiplier to the default level. However, in this variation there is a risk of exploiting game rules, or "gaming" the system, as discussed in more detail below.

The above methodology illustrates that line multipliers are applied on a per-pay line basis, independently of whether a player wins or loses on other pay lines. That is, whether a pay line multiplier is incremented depends only on whether the player continues to win on that particular pay line. As long as the player keeps winning on that particular pay line, the line multiplier corresponding to that particular pay line will continue to increase, up to the optional maximum line multiplier.

Also, variations of the above method may be used according to different embodiments, or in bonus rounds of a video slot machine using aspects of line multipliers described herein. According to an aspect of the invention, during a bonus round, step 403 may be omitted such that the line multipliers do not reset until the end of the bonus round. When a player wins the bonus, the player may be awarded some predetermined number of free spins. During the free spins, the line multipliers do not reset, regardless of whether the player wins on each pay line or not, resulting in line multipliers that only increase during the bonus round when the player wins on a particular pay line, and that are not susceptible to being reset to the default level until after all the free spins have been played. If a player wins the bonus and thereby earns one or more free spins based on a pay line that already has an increased line multiplier, the player may begin the bonus round with each pay line in the bonus round having a corresponding line multiplier equal to the line multiplier of the pay line on which the player earned the bonus spins. During the free spins the line multipliers for each pay line may continue to increase as described above.

Other steps in FIGS. 3-4 may be optional, removed, split, combined or moved to different positions in the process. Player credits and wagers may be managed differently, and line multipliers may be incremented in a different order. However, the general principle remains the same—a line multiplier corresponding to a particular pay line continues to increase as the player wins on that particular pay line, irrespective of the outcome of other pay lines. The line multiplier for a particular pay line may reset to a default level when the player does not win on that particular pay line. In some embodiments, the line multipliers might not reset until after a predetermined number of free spins have been played.

According to another variation, in order to prevent players from exploiting game rules to increase his or her payout, all line multipliers may be reset when the player changes his or her wager amount and/or number of active lines. That is, if a player could change his or her wager amount and/or active pay lines without affecting current line multipliers, a player might be able to increase his or her return on investment by increasing the wager amount per line when there are active line multipliers, and decreasing the wager amount per line when there are no increased line multipliers. Also, a player is preferably not allowed to decrease the number of active pay lines to avoid playing lines having only the default line multiplier, nor should the player be allowed to increase the number of active pay lines to include a new line with an increased multiplier. With these preferences and risks in mind, a proprietor can of course choose any variation discussed herein without departing from the inventive principles discussed herein.

To further illustrate aspects of the invention, a specific use case scenario will now be described with reference to FIG. 2 and FIGS. 5-12. FIG. 2 illustrates a screen shot of video slot machine 101 prior to the player selecting "spin" button 215. FIG. 2 does illustrate that the player's wager is 15 credits, with a base value of $0.01/credit, as indicated by the 1 cent denomination in the upper right corner in conjunction with the bet amount 220 of 15 credits. The player therefore is wagering 1 credit per line for 15 lines, and each credit is worth $0.01, i.e., the line wager is $0.01 for each of 15 lines.

Figure 5:
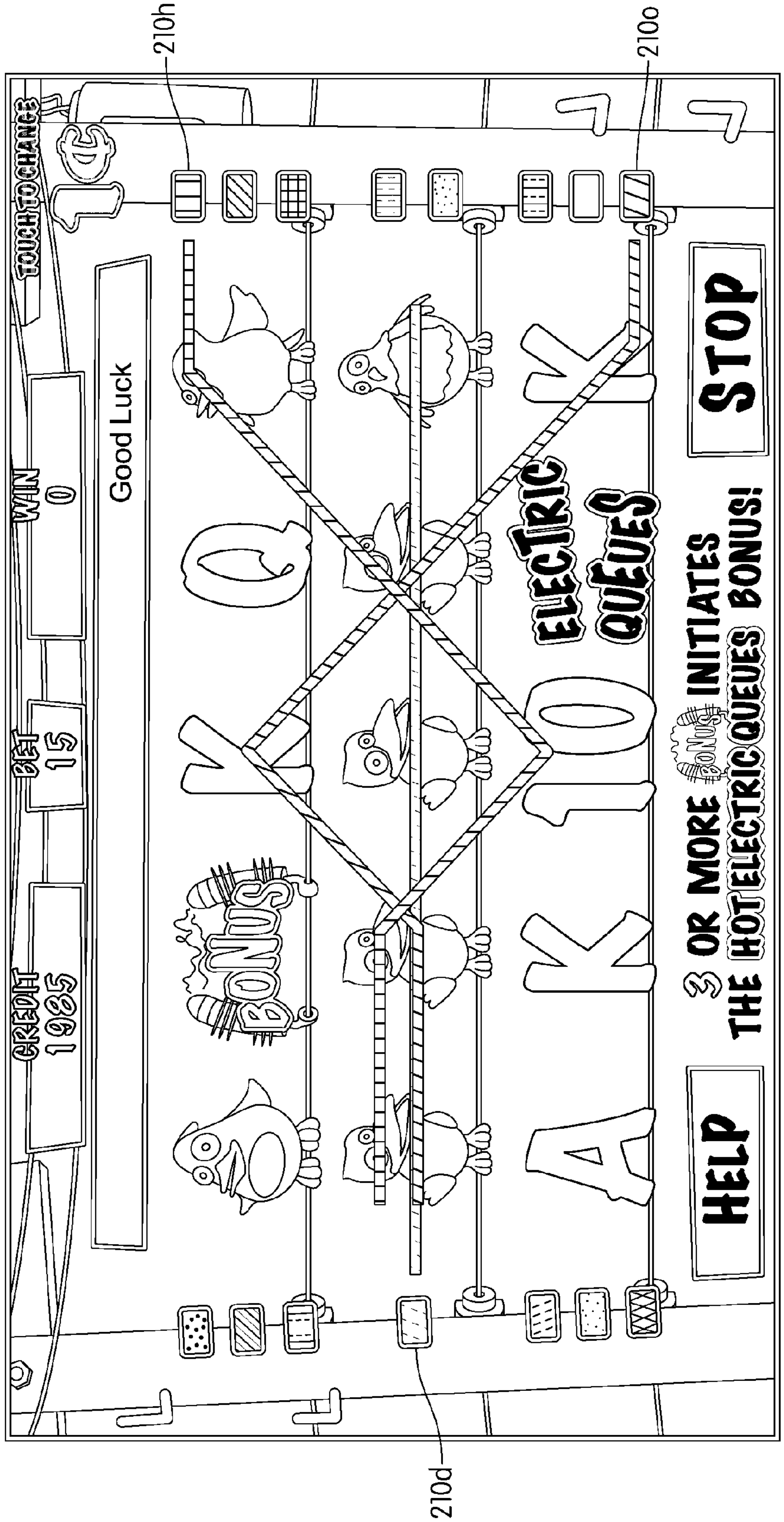
FIG. 5 illustrates a screen shot of a video slot machine according to one or more illustrative aspects of the invention.
Figure 6:
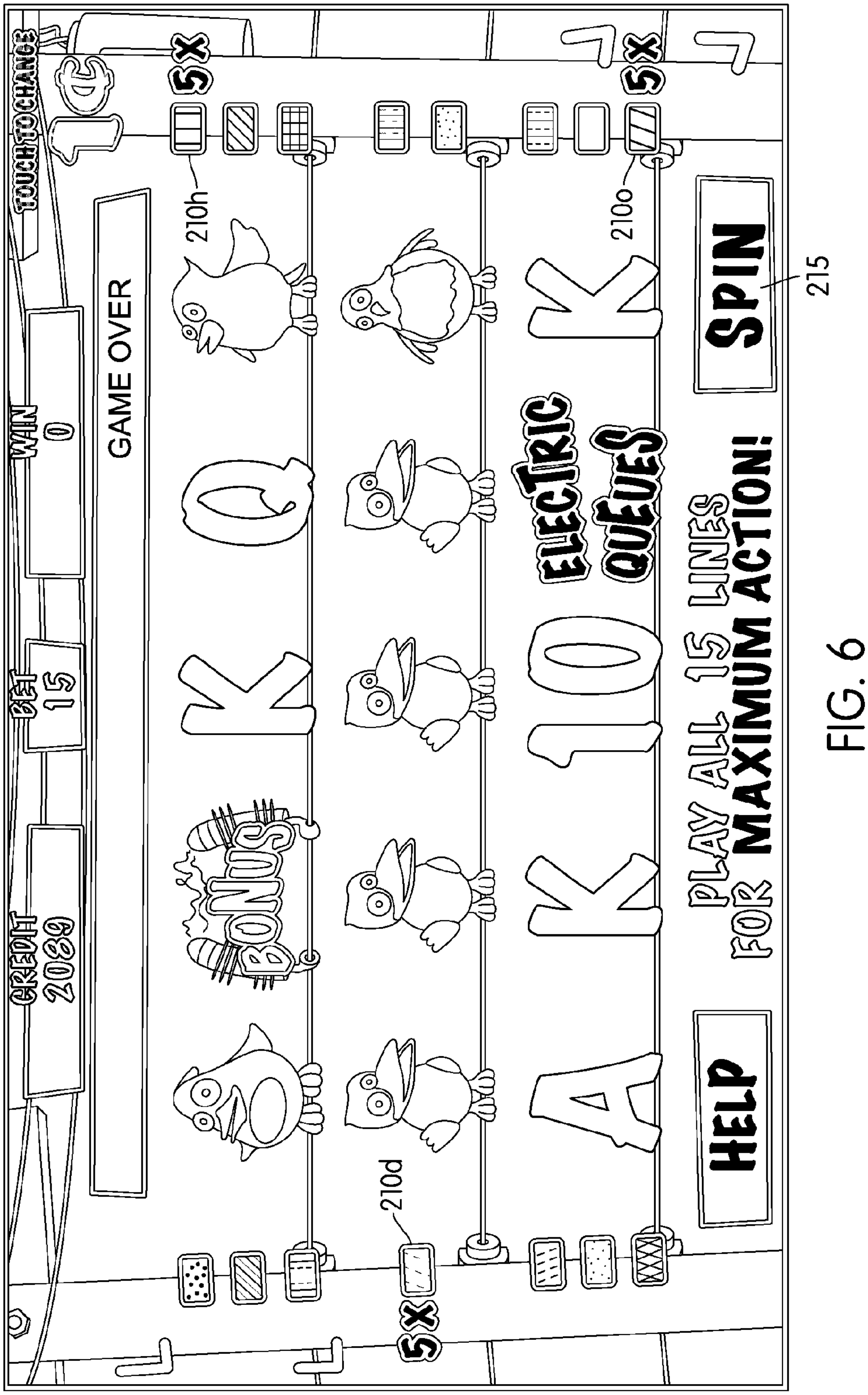
FIG. 6 illustrates a screen shot of a video slot machine according to one or more illustrative aspects of the invention.
Figure 13:
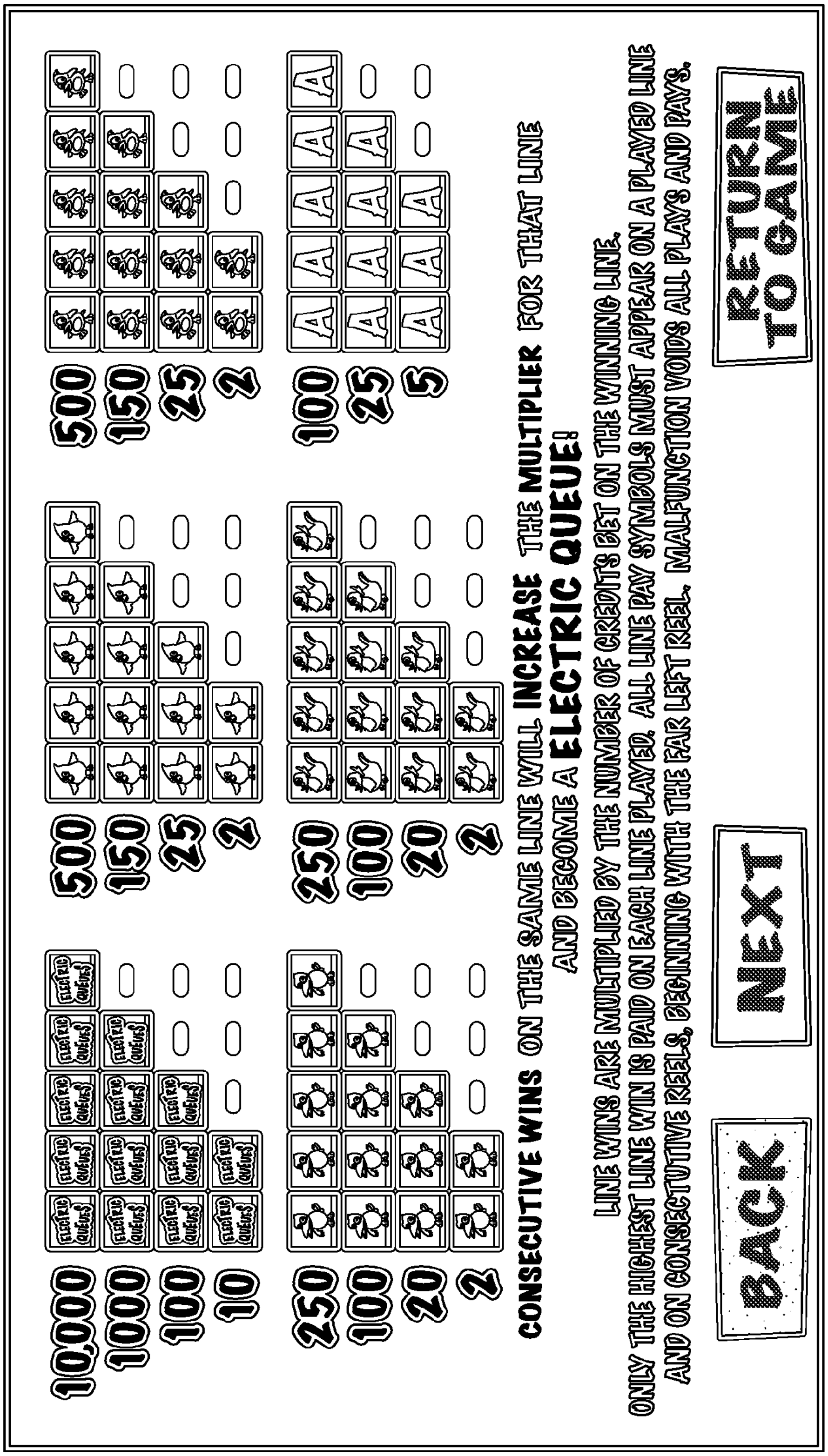
FIG. 13 illustrates a screen shot of a video slot machine according to one or more illustrative aspects of the invention.
Figure 14:
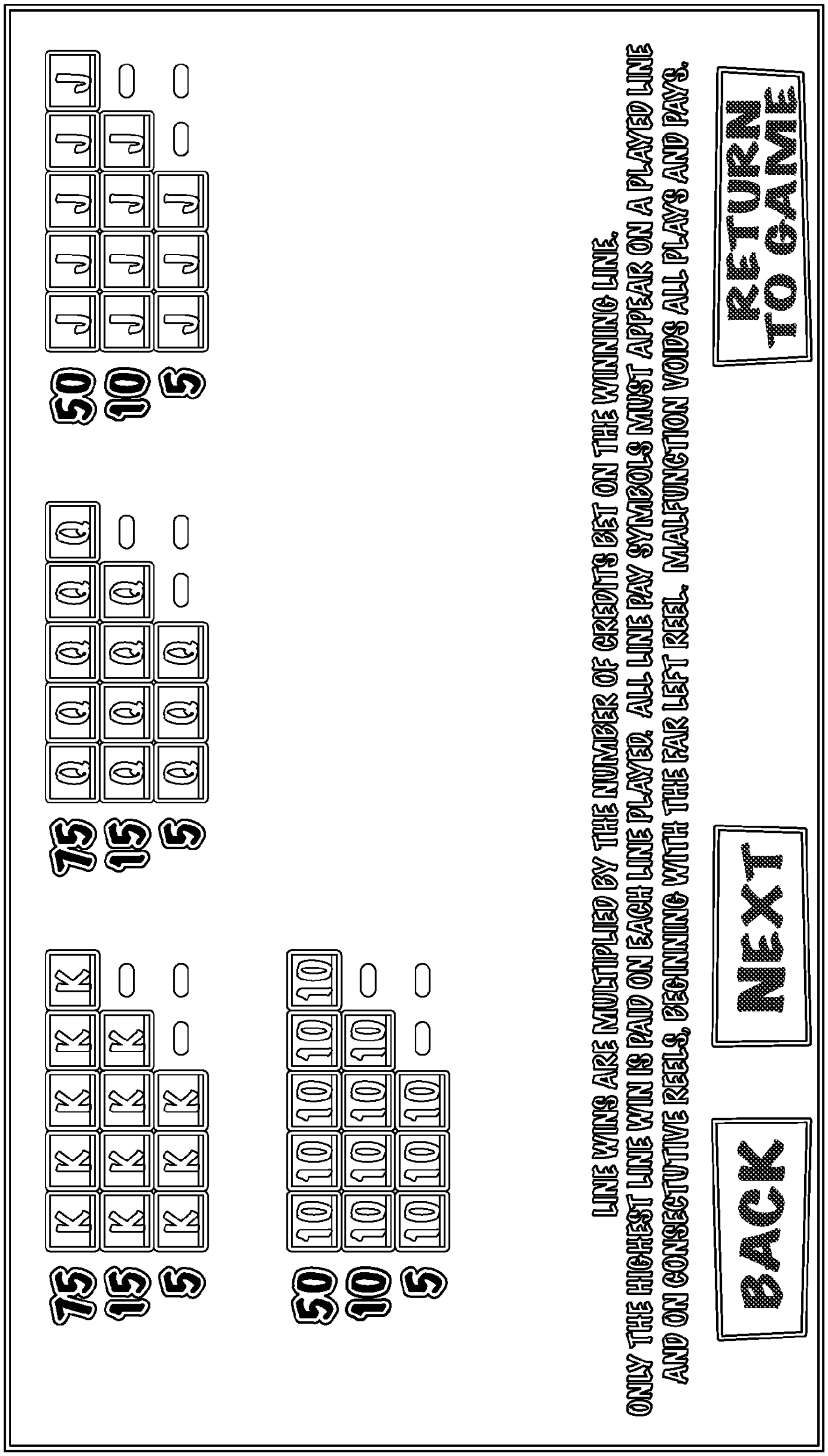
FIG. 14 illustrates a screen shot of a video slot machine according to one or more illustrative aspects of the invention.

FIG. 5 illustrates a screen shot of video slot machine 101 after a first spin by the player. The player's account has been debited 15 credits, and the video slot machine indicates that the player wins on lines **210*d* (wins 100 credits), 210*h* (wins 2 credits), and 210*o* (wins 2 credits) based on the appearance of two consecutive identical birds beginning with the first position in each pay line (pay lines are shown in FIG. 15, and the applicable winning combinations are shown in FIG. 13; the first position refers to the left most symbol position of a pay line in this example). FIG. 6 illustrates that the line multipliers corresponding to pay lines 210*d*, 210*h*, and 210*o*** have been incremented, in this example to the next multiple of 5, i.e., to 5×. The player then repeats the same bet and activates the "spin" button 215, resulting in FIG. 7

Figure 7:
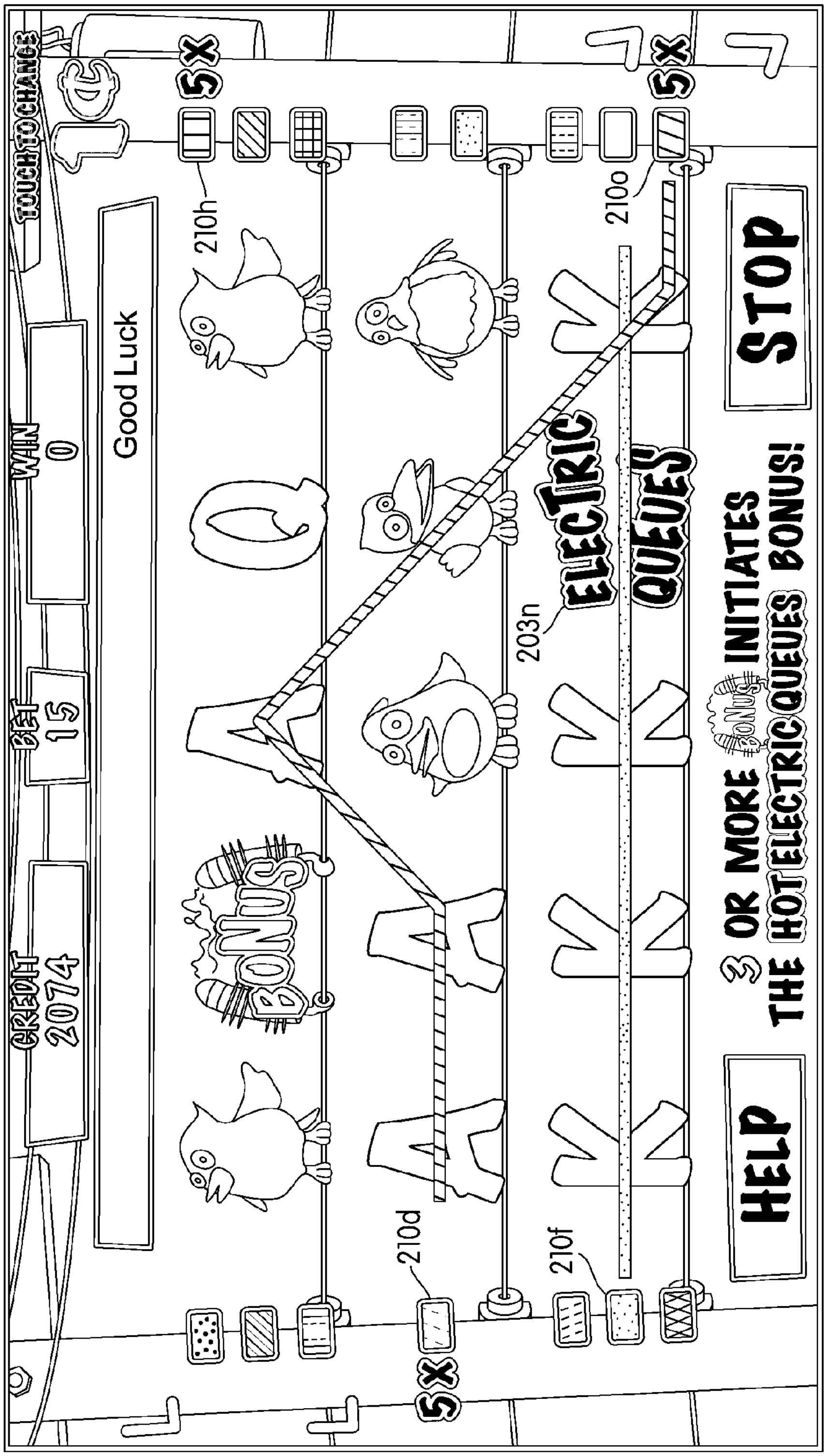
FIG. 7 illustrates a screen shot of a video slot machine according to one or more illustrative aspects of the invention.
Figure 8:
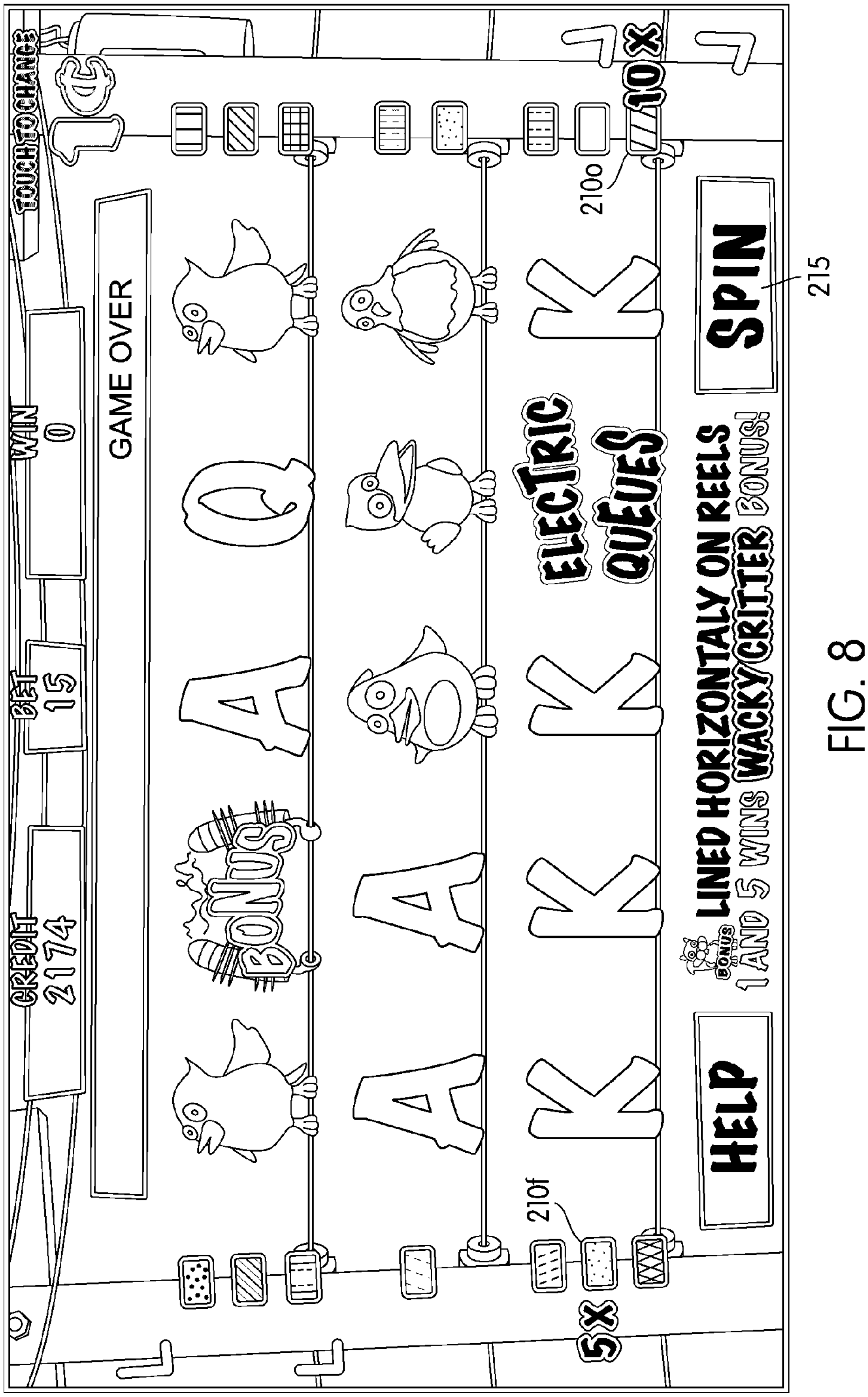
FIG. 8 illustrates a screen shot of a video slot machine according to one or more illustrative aspects of the invention.

FIG. 7 illustrates that the player wins on line 210*f* (5 K's, i.e., kings, =75 credits) and 210*o* (5×5 credits=25 credits). The player's win on line 210*f* is assisted by the presence of a wild symbol (here, the "Electric Queues" symbol in location 203*n*). Because the player did not win on pay lines 210*d* and 210*h*, the line multipliers for those two pay lines is reset to the default level, here 1×, as illustrated in FIG. 8 (shown by the lack of a line multiplier). However, because the player won again on line 210*o*, the line multiplier corresponding to pay line 210*o* is again increased to the next multiple of 5, i.e., 10×. Also, because the player on pay line 210*f*, the line multiplier corresponding to pay line 210*f* is increased to 5×. The player repeats the same bet and selects "spin" button 215, resulting in FIG. 9.

Figure 9:
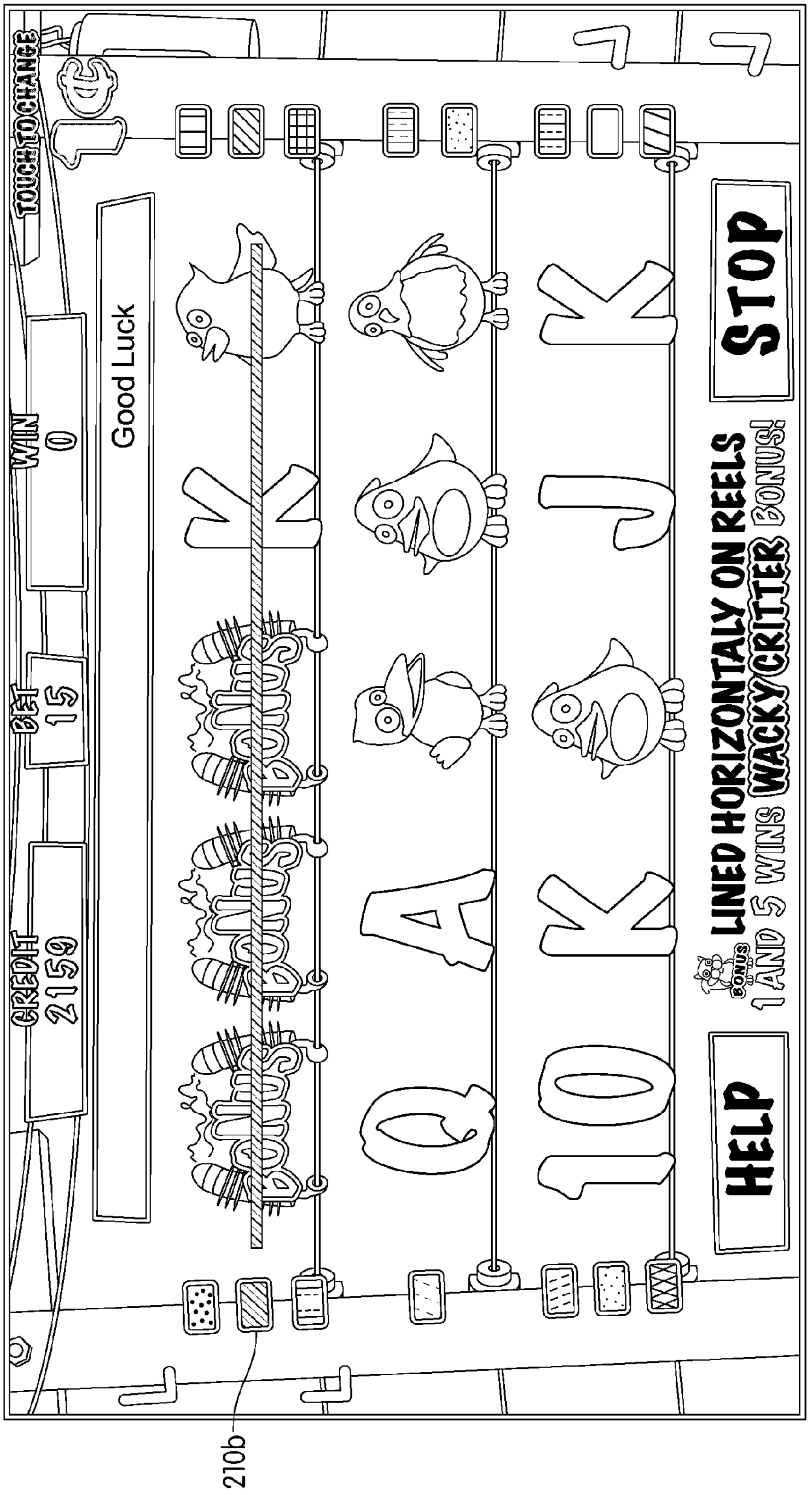
FIG. 9 illustrates a screen shot of a video slot machine according to one or more illustrative aspects of the invention.
Figure 10:
FIG. 10 illustrates a screen shot of a video slot machine according to one or more illustrative aspects of the invention.
Figure 11:
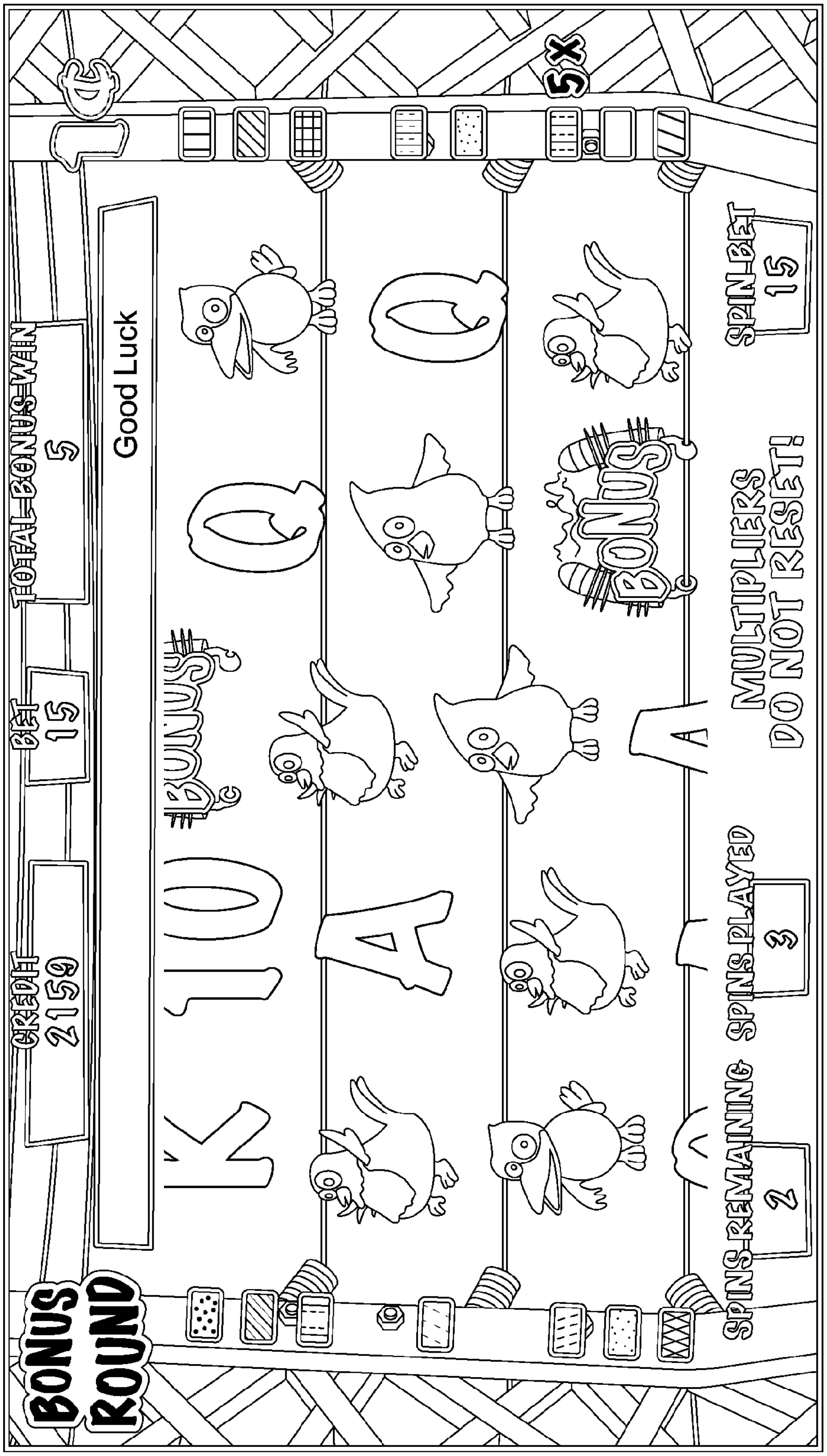
FIG. 11 illustrates a screen shot of a video slot machine according to one or more illustrative aspects of the invention.
Figure 12:
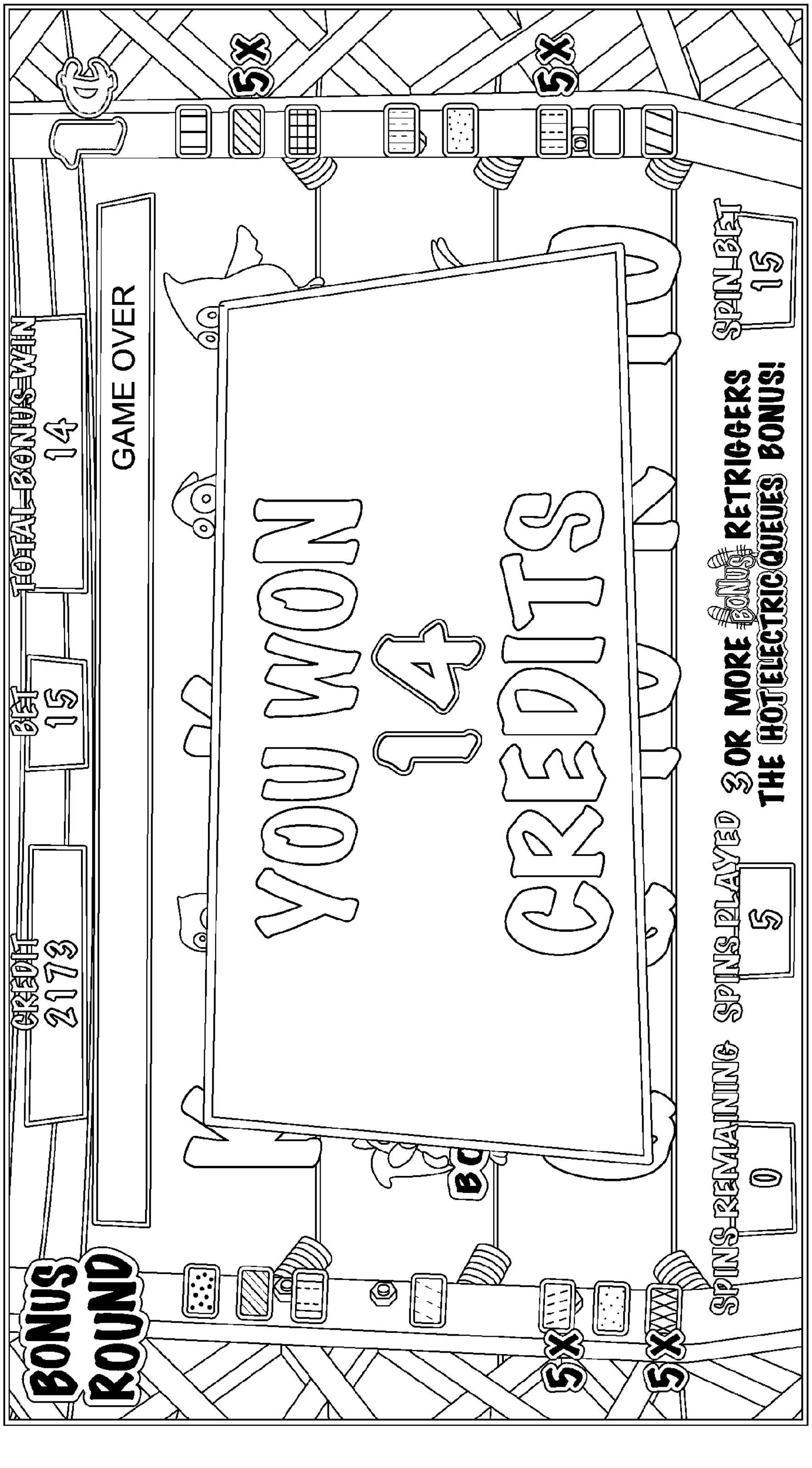
FIG. 12 illustrates a screen shot of a video slot machine according to one or more illustrative aspects of the invention.

As shown in FIG. 9, the player earns the bonus round based on pay line 210*b*, which comprises three consecutive bonus symbols starting in the first position. As shown in FIG. 10, three consecutive bonus symbols earns the player 5 free spins of the bonus round (see FIG. 17 for description of payout). FIG. 11 illustrates the video slot machine 101 performing the five (5) free spins, during which the video slot machine increments the line multiplier on any pay line on which the player wins any amount. As indicated in FIG. 11, line multipliers do not reset until after all free spins have been played. FIG. 12 illustrates that, in this example, the player won a total of 14 credits during the bonus round, which are credited to the player's account or tab.

Variations may be made to the embodiments described above without departing from the inventions described herein. For example, a line multiplier, e.g., 5×, may be awarded randomly to one or more pay lines every spin of the video slot game. Thus, at the start of a spin, a random pay line or pay lines is/are designated as one or more "electrified" or powerful lines with the randomly increased multiplier, and any line win amount is multiplied by the increased multiplier. The amount the multiplier is increased may be fixed or random, up to some predetermined maximum level, where it is less likely that the multiplier is very high, e.g., 25×, and more likely that the random multiplier is low, e.g., 5×.

According to another variation, just as line multipliers go up in predefined increments or steps, line multipliers may similarly decrease in predefined increments or steps as a player loses. Stated another way, when a player wins on a pay line, the line multiplier for that pay line increments (e.g., 1×, 5×, 10×, . . . , Max.); when the player loses on a pay line, the line multiplier for that pay line decrements according to some predefined steps, pattern, or other algorithm, e.g., Max., . . . 15×, 10×, 5×, 1× (base/default level).

In yet another variation, a line multiplier may stay at a maximum earned level for any predetermined number of spins prior to resetting. For example, if a player wins twice in a row on a pay line, the line multiplier for that line might remain at its increased level until the player loses twice in row on that pay line. Similarly, if a player wins thrice (three times) in a row on a pay line, the line multiplier for that line might remain at its increased level until the player loses thrice in row on that pay line. The number of game for which a line multiplier remains constant even as the player loses may be any predetermined amount, or based on any predetermined algorithm such as a buy-in, initiated by a special symbol appearing in the field of play, or calculated as part of the game math as stored in the pay table.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the following claims.

What is claimed is:

1. An apparatus for playing a video game of chance, said apparatus comprising:

a display screen;

a processor; and memory storing computer readable instructions that, when executed by the processor, cause the apparatus to provide the video game of chance, comprising:

a) visually depicting on the display screen a symbol display area comprising a plurality of symbol locations;

b) identifying a plurality of pay lines, each pay line comprising a unique ordered proper subset of the plurality of symbol locations, and wherein each pay line has a corresponding individual line multiplier;

c) storing a player wager comprising one or more active pay lines, and comprising a wager amount per active pay line;

d) determining a game outcome by displaying one of a plurality of symbols in each of the plurality of symbol locations;

e) for each active pay line, determining a line payout based on a comparison of its unique ordered proper subset of symbol locations to a pay table, and further based on the wager amount per pay line, and further multiplied by its corresponding individual line multiplier;

f) crediting all line payouts to the player; and g) for each active pay line on which a line payout has been credited to the player, incrementing its corresponding individual line multiplier for an immediately subsequent game, independent of the line payout based on all other pay lines.

2. The apparatus of claim 1, wherein incrementing the corresponding individual line multiplier comprises incrementing the corresponding individual line multiplier to a next multiple of five (5).

3. The apparatus of claim 1, wherein the video game of chance further comprises, for each active pay line on which a line payout has not been credited to the player, resetting its corresponding individual line multiplier to a default value.

4. The apparatus of claim 1, wherein the symbol display area comprises a three-by-five array of symbol locations, and wherein each pay line comprises one symbol location from each of the five columns in the array.

5. The apparatus of claim 1, wherein when the apparatus determines that a line payout comprises a bonus round, setting all individual line multipliers for the bonus round initially to be the same value as the line multiplier corresponding to the line on which the payout was made in the bonus round.

6. The apparatus of claim 1, wherein incrementing the corresponding individual line multiplier comprises incrementing the corresponding individual line multiplier only if the incremented line multiplier will be below a maximum allowable line multiplier.

7. The apparatus of claim 1, wherein the video game of chance further comprises, for each active pay line on which a line payout has not been credited to the player, decrementing the corresponding individual line multiplier when the corresponding individual line multiplier is above a default level.

8. The apparatus of claim 1, wherein the video game of chance further comprises, for each active pay line on which a line payout has not been credited to the player, resetting the corresponding individual line multiplier to a default value only after a line payout has not been credited to the player on that active pay line for a predetermined number of game outcomes in a row.

9. A slot machine method, comprising:

a processor executing computer-readable instructions to perform the following:

a) visually depicting on a display screen a symbol display area comprising a plurality of symbol locations;

b) identifying a plurality of pay lines, each pay line comprising a unique ordered proper subset of the plurality of symbol locations, and wherein each pay line has a corresponding individual line multiplier;

c) storing a player wager comprising one or more active pay lines, and comprising a wager amount per active pay line;

d) determining a game outcome by displaying one of a plurality of symbols in each of the plurality of symbol locations;

e) for each active pay line, determining a line payout based on a comparison of its unique ordered proper subset of symbol locations to a pay table, and further based on the wager amount per pay line, and further multiplied by its corresponding individual line multiplier;

f) crediting all line payouts to the player; and g) for each active pay line on which a line payout has been credited to the player, incrementing its corresponding individual line multiplier for an immediately subsequent game, independent of the line payout based on all other pay lines.

10. The method of claim 9, wherein incrementing the corresponding individual line multiplier comprises incrementing the corresponding line multiplier to a next multiple of five (5).

11. The method of claim 9, wherein the method further comprises, for each active pay line on which a line payout has not been credited to the player, resetting its corresponding individual line multiplier to a default value.

12. The method of claim 9, wherein the symbol display area comprises a three-by-five array of symbol locations, and wherein each pay line comprises one symbol location from each of the five columns in the array.

13. The method of claim 9, wherein when it is determined that a line payout comprises a bonus round, setting all individual line multipliers for the bonus round initially to be the same value as the individual line multiplier corresponding to the line on which the payout was made in the bonus round.

14. The method of claim 9, wherein incrementing the corresponding individual line multiplier comprises incrementing the corresponding individual line multiplier only if the incremented line multiplier will be below a maximum allowable line multiplier.

15. The method of claim 9, further comprising, for each active pay line on which a line payout has not been credited to the player, decrementing the corresponding individual line multiplier when the corresponding individual line multiplier is above a default level.

16. The method of claim 9, further comprising, for each active pay line on which a line payout has not been credited to the player, resetting the corresponding individual line multiplier to a default value only after a line payout has not been credited to the player on that active pay line for a predetermined number of game outcomes in a row.

17. One or more non-transitory computer readable media storing computer readable instructions that, when executed, cause a device to provide a video game of chance, said instructions comprising:

a) visually depicting on a display screen a symbol display area comprising a plurality of symbol locations;

b) identifying a plurality of pay lines, each pay line comprising a unique ordered proper subset of the plurality of symbol locations, and wherein each pay line has a corresponding individual line multiplier;

c) storing a player wager comprising one or more active pay lines, and comprising a wager amount per active pay line;

d) for each active pay line on which the player was credited a line payout in an immediately previous game, incrementing its corresponding individual line multiplier;

e) determining a game outcome by displaying one of a plurality of symbols in each of the plurality of symbol locations;

f) for each active pay line, determining a line payout based on a comparison of its unique ordered proper subset of symbol locations to a pay table, and further based on the wager amount per pay line and further multiplied by its corresponding individual line multiplier; and g) crediting all line payouts to the player.

18. The non-transitory computer readable media of claim 17, wherein incrementing the corresponding individual line multiplier comprises incrementing the corresponding individual line multiplier to a next multiple of five (5).

19. The non-transitory computer readable media of claim 17, wherein said instructions further comprise, for each active pay line on which a line payout has not been credited to the player, resetting its corresponding individual line multiplier to a default value.

20. The non-transitory computer readable media of claim 17, wherein the symbol display area comprises a three-by-five array of symbol locations, and wherein each pay line comprises one symbol location from each of the five columns in the array.

21. The non-transitory computer readable media of claim 17, wherein when it is determined that a line payout comprises a bonus round, setting all individual line multipliers for the bonus round initially to be the same value as the individual line multiplier corresponding to the corresponding to the line on which the payout was made in the bonus round.

22. The non-transitory computer readable media of claim 17, wherein incrementing the corresponding individual line multiplier comprises incrementing the corresponding individual line multiplier only if the incremented line multiplier will be below a maximum allowable line multiplier.

23. The non-transitory computer readable media of claim 17, wherein said instructions further comprise, for each active pay line on which a line payout has not been credited to the player, decrementing the corresponding individual line multiplier when the corresponding individual line multiplier is above a default level.

24. The non-transitory computer readable media of claim 17, wherein said instructions further comprise, for each active pay line on which a line payout has not been credited to the player, resetting the corresponding individual line multiplier to a default value only after only after a line payout has not been credited to the player on that active pay line for a predetermined number of game outcomes in a row.

* * * * *